(12) United States Patent
Iacovangelo

(10) Patent No.: US 6,261,694 B1
(45) Date of Patent: Jul. 17, 2001

(54) INFRARED REFLECTING COATINGS

(75) Inventor: Charles Dominic Iacovangelo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/271,658

(22) Filed: Mar. 17, 1999

(51) Int. Cl.[7] .................................................. B32B 27/36

(52) U.S. Cl. ........................ 428/412; 428/332; 428/458; 428/469

(58) Field of Search ..................................... 428/412, 457, 428/469, 332, 458

(56) References Cited

U.S. PATENT DOCUMENTS

| 3,161,615 | 12/1964 | Goldberg . |
| 3,220,973 | 11/1965 | Goldberg . |
| 3,312,659 | 4/1967 | Kurkjy et al. . |

(List continued on next page.)

FOREIGN PATENT DOCUMENTS

| 0464789 | 7/1991 | (EP) . |
| 0887433 | 12/1998 | (EP) . |
| 2586245 | 8/1986 | (FR) . |
| 11-070610 | 3/1999 | (JP) . |
| 8901957 | 8/1988 | (WO) . |
| 9011975 | 10/1990 | (WO) . |
| 9213517 | 2/1992 | (WO) . |
| 9713802 | 10/1996 | (WO) . |

OTHER PUBLICATIONS

S. Anders et al., Formation of Metal Oxides by Cathodic Arc Deposition, 76–77 Surface and Coatings Technology 167–73 (1995).

H. Bolt et al., Gradient Metal—a–C:H Coatings Deposited From Dense Plasma by a Combined PVD/CVD Process, 98 Surface and Coatings Technol.ogy 1518–1523 (1998).

D.E. Brodie et al., Characterization of ZnO for the Fabrication of Conductor–Insulator–Semiconductor (CIS) Solar Cells, Conf. Proc. for IEEE 14th Photovoltaic Spec. Conf. 468–471 (Jan. 7–10, 1980).

D.A. Gerdeman and N.L. Hecht, *Arc Plasma Technology in Materials Science* 1–17 (1972).

S. Jager et al., Comparison of Transparent Conductive Oxide Thin Films Prepared by A.C. and D.C. Reactive Magnetron Sputtering, 98 Surface and Coatings Technology 1304–1314 (1998).

Jianhua Hu and Roy G. Gordon, Deposition of Boron Doped Zinc Oxide Films and Their Electrical and Optical Properties, 139 J. Electrochem. Soc. 2014–2022 (1992).

Z.–C. Jin et al., Optical Properties of Sputter–Deposited ZnO:Al Thin Films, 64 J. Appl. Phys. 5117–5131 (1988).

R.A. MacGill et al., Cathodic Arc Deposition of Copper Oxide Thin Films, 78 Surface and Coatings Technology 168–72 (1996).

S. Major et al., Electrical and Optical Transport in Undoped and Indium–doped Zinc Oxide Films, 1 J. Mater. Res. 300–310 (1986).

S. Major et al., Highly Transparent and Conducting Indium–Doped Zinc Oxide Films by Spray Pyrolysis, 108 Thin Solid Films 333–340 (1983).

(List continued on next page.)

*Primary Examiner*—D. S. Nakarani
*Assistant Examiner*—Monique R. Jackson
(74) *Attorney, Agent, or Firm*—Robert P. Santandrea; Noreen C. Johnson

(57) ABSTRACT

An infrared radiation reflecting and ultraviolet radiation absorbing coating is formed over a polymeric substrate. Preferably, the substrate is a transparent polycarbonate window, and the coating comprises an IZO/Ag/IZO multilayer film. The layers are preferably deposited by arc plasma deposition or by sputtering.

31 Claims, 13 Drawing Sheets

U.S. PATENT DOCUMENTS

| | | |
|---|---|---|
| 3,312,660 | 4/1967 | Kurkjy et al. . |
| 3,313,777 | 4/1967 | Elam et al. . |
| 3,576,656 | 4/1971 | Webb et al. . |
| 3,666,614 | 5/1972 | Snedeker et al. . |
| 3,989,672 | 11/1976 | Vestergaard . |
| 4,194,038 | 3/1980 | Baker et al. . |
| 4,200,681 | 4/1980 | Hall et al. . |
| 4,210,699 | 7/1980 | Schroeter et al. . |
| 4,224,378 | 9/1980 | Schroeter et al. . |
| 4,242,381 | 12/1980 | Goossens et al. . |
| 4,454,275 | 6/1984 | Rosenquist . |
| 4,799,745 * | 1/1989 | Meyer et al. ............. 359/360 |
| 4,842,941 | 6/1989 | Devins et al. . |
| 4,871,580 | 10/1989 | Schram et al. . |
| 4,927,704 | 5/1990 | Reed et al. . |
| 4,943,484 | 7/1990 | Goodman ................. 428/441 |
| 4,948,485 | 8/1990 | Wallsten et al. . |
| 5,008,148 | 4/1991 | Thurm et al. . |
| 5,019,458 * | 5/1991 | Elgat et al. ............. 428/630 |
| 5,051,308 | 9/1991 | Reed et al. . |
| 5,156,882 | 10/1992 | Rzad et al. . |
| 5,271,994 | 12/1993 | Termath ................. 428/216 |
| 5,298,587 | 3/1994 | Hu et al. . |
| 5,320,875 | 6/1994 | Hu et al. . |
| 5,342,676 * | 8/1994 | Zagdoun ................. 428/216 |
| 5,433,786 | 7/1995 | Hu et al. . |
| 5,463,013 | 10/1995 | Tokuda et al. . |
| 5,480,722 | 1/1996 | Tomonaga et al. . |
| 5,494,712 | 2/1996 | Hu et al. . |
| 5,510,448 | 4/1996 | Fontane et al. . |
| 5,614,248 | 3/1997 | Schiller et al. . |
| 5,635,087 | 6/1997 | Schiller et al. . |
| 5,718,967 | 2/1998 | Hu et al. . |

OTHER PUBLICATIONS

S. Maniv et al., Transparent Conducting Zinc Oxide and Indium–Tin Oxide Films Prepared by Modified Reactive Planar Magnetron Sputtering, A1 J. Vac. Sci. Tech. 1370–1375 (1983).

Tadatsugu Minami et al., Group III Impurity Doped Zinc Oxide Thin Films Prepared by RF Magnetron Sputtering, 24 Japanese J. of Appl. Phy. L781–L784, (1985).

Tadatsugu Minami et al., Highly Conductive and Transparent Silicon Doped Zinc Oxide Thin Films Prepared by RF Magnetron Sputtering, 25 Japanese J. of Appl. Phys. L776–L779, (1986).

M. Miyazaki and E. Ando, Durability Improvement of Ag–Based Low–Emissivity Coatings, 178 J. Non–Crystalline Solids 245–249 (1994).

C.X. Qiu and I. Shih, Tin–and Indium–Doped Zinc Oxide Films Prepared by RF Magnetron Sputtering, 13 Solar Energy Materials 75–84 (1986).

D. Raviendra and J.K. Sharma, Electroless Deposition of Cadmium Stannate, Zinc Oxide, and Aluminum–Doped Zinc Oxide Films, 58 J. Appl. Phys. 838–844 (1985).

R.E.I. Schropp et al., Transparent and Conductive Thin Films of ZnO for Photovoltaic Applications Prepared by RF Magnetron Sputtering, 1 Conf. Rec. of 20th IEEE Photovoltaic Spec. Conf. 273–276 (Sep. 26, 1988).

B.E. Sernelius et al., Band–Gap Tailoring of ZnO by Means of Heavy Al Doping, 37 Physical Review B of Am. Phys. Soc., 10244–10248 (1998).

I. Shih and C.X. Qiu, Indium–Doped Zinc Oxide Thin Films Prepared by RF Magnetron Sputtering, 58 J. Appl. Phys 2400–2401 (1985).

S. Sreedhara Reddy et al., Optical Properties of Spray Deposited ZnO Films, 77 Solid State Communications 899–901 (1991).

* cited by examiner

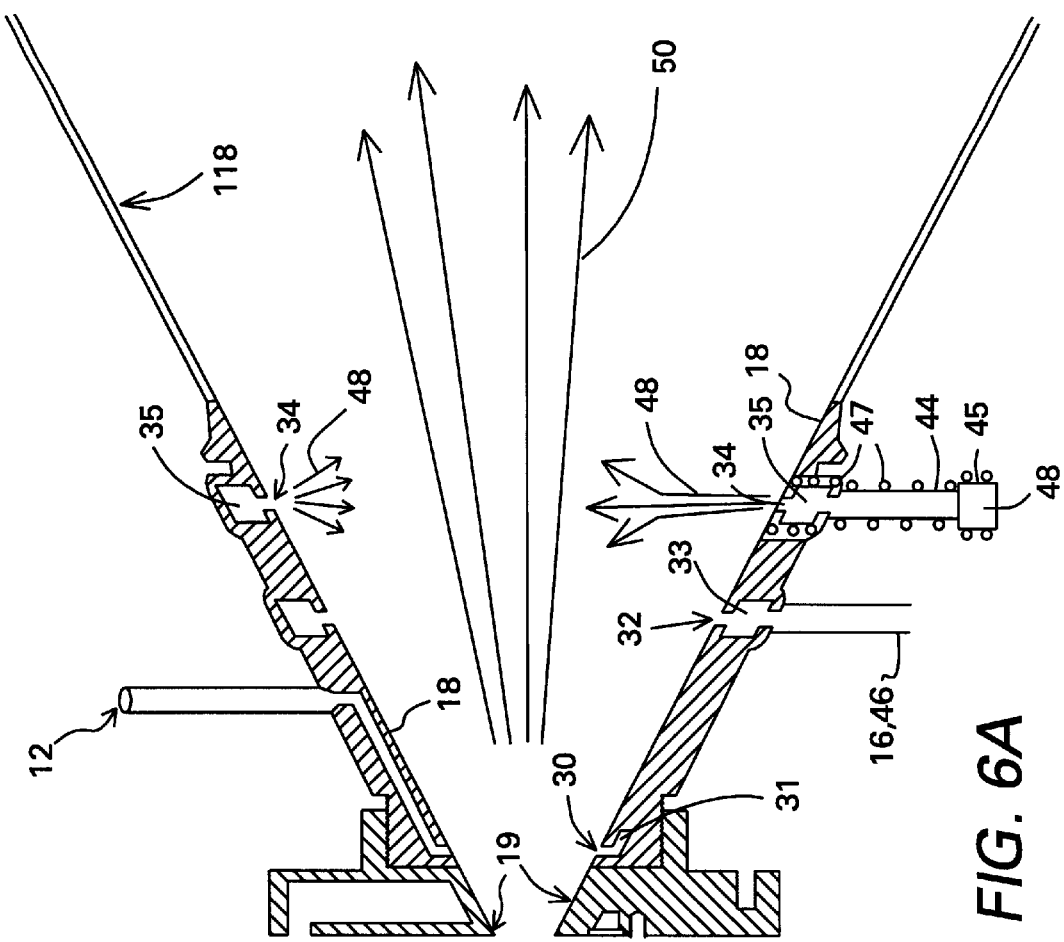
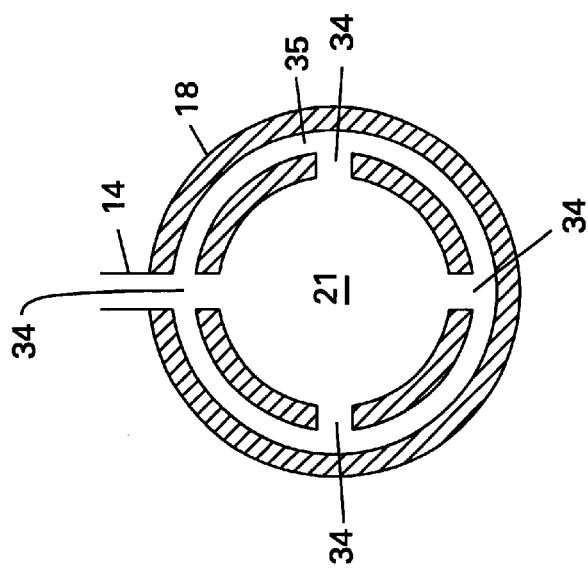
FIG. 6A
FIG. 5B

US 6,261,694 B1

INFRARED REFLECTING COATINGS

FIELD OF THE INVENTION

The present invention is directed to an infrared (IR) reflecting coating for a substrate, and more particularly to a metal oxide/metal/metal oxide IR reflecting and UV absorbing coating for polymeric windows.

BACKGROUND

Car manufacturers have traditionally used glass as the material for car windows. However, recently it has become desirable to substitute glass windows with windows made of a plastic or polymer resin such as polycarbonate (PC). Polymeric windows are often advantageous compared to glass windows because of their low weight, high strength and ease of shaping.

One potential limitation to the use of polymeric windows in cars is that infrared radiation passes through the windows unfiltered. This results in a heavy thermal load on air conditioning and also affects passenger comfort. In general, it is believed that the automotive industry will not switch from glass to polymeric windows unless IR filtering equal to automotive glass is met.

One known approach to providing IR filtering for glass is to provide an IR reflecting metal layer, such as Ag or Al. However, these metals are chemically unstable and will degrade in air, forming opaque metal oxides and sulfides unless protected. Thus, IR reflecting layers are typically used only in the middle of double pane glass structures where they are protected from exposure to air or water.

A second known IR filtering approach used on glass is the application of an IR reflecting oxide, such as indium tin oxide (ITO) to the glass substrate. ITO is electrically conductive and reflects well in the IR (i.e. wavelengths above 1500 nm). However, ITO does not reflect well in the near IR (i.e. wavelengths between 800 and 1500 nm). Filtering in the near IR is important for vehicle applications to prevent the vehicle cabin from overheating. The electromagnetic spectrum containing the IR, near IR, visible and UV regions is shown in FIG. 1.

A third approach that has been demonstrated on glass windows is to sandwich an Ag or Al infrared reflecting layer between two titanium dioxide ($TiO_2$) or zinc oxide (ZnO) layers. This approach, however, is unsuitable for polymeric substrates for several reasons. For example, the $TiO_2$ containing coating acts as only a partial absorber of UV radiation. Because $TiO_2$ provides an insufficient amount of UV absorption, polymeric windows coated with $TiO_2$ would eventually turn a shade of yellow. Furthermore, $TiO_2$ is photocatalytic and will degrade PC. Therefore, $TiO_2$ coated polymers are generally unsuitable as a car window material.

ZnO provides a greater amount of UV absorption than $TiO_2$ and provides UV absorption to higher wavelengths. Thus, ZnO would provide enough UV protection to prevent polymers from turning yellow when exposed to sunlight. However, a ZnO layer fabricated by prior art methods is known to dissolve in water. Thus, a prior art ZnO layer typically has an unacceptable water soak stability, as exhibited by increased haze and decreased optical density after being soaked in water for an extended period of time.

SUMMARY

In view of the foregoing, it would be desirable to provide a multi-layer coating structure that reflects better in the near IR, has good weather and chemical stability, and good properties and performance when deposited on polymeric substrates. A method of making a multi layer structure with good performance would also be desirable.

The present invention provides a multi-layer structure comprising a polymeric substrate, a first metal oxide layer on the transparent substrate, an infrared radiation reflection layer on the first metal oxide layer, and a second metal oxide layer on the infrared radiation reflection layer.

The present invention also provides a method of coating a polymeric substrate comprising the steps of forming first metal oxide layer on the polymeric substrate, forming an infrared radiation reflection layer on the first metal oxide layer, and forming a second metal oxide layer on the infrared radiation reflection layer.

The present invention also provides a window usable in a vehicle, a building, a display device, or an apparatus comprising a polymeric base, a first zinc oxide (ZnO), aluminum zinc oxide (AZO) or indium zinc oxide (IZO) ultraviolet radiation absorption layer, a silver (Ag) or aluminum (Al) infrared radiation reflection layer, and a second IZO, AZO or ZnO ultraviolet radiation absorption layer.

BRIEF DESCRIPTION OF THE DRAWINGS

FIG. 5B is a front cross sectional view along line B–B' in FIG. 5A.

FIGS. 6A–E are side cross sectional views of apparatus used to manufacture the glazed substrate according to alternative embodiments of the present invention.

DETAILED DESCRIPTION OF THE PREFERRED EMBODIMENTS

Figure 1:
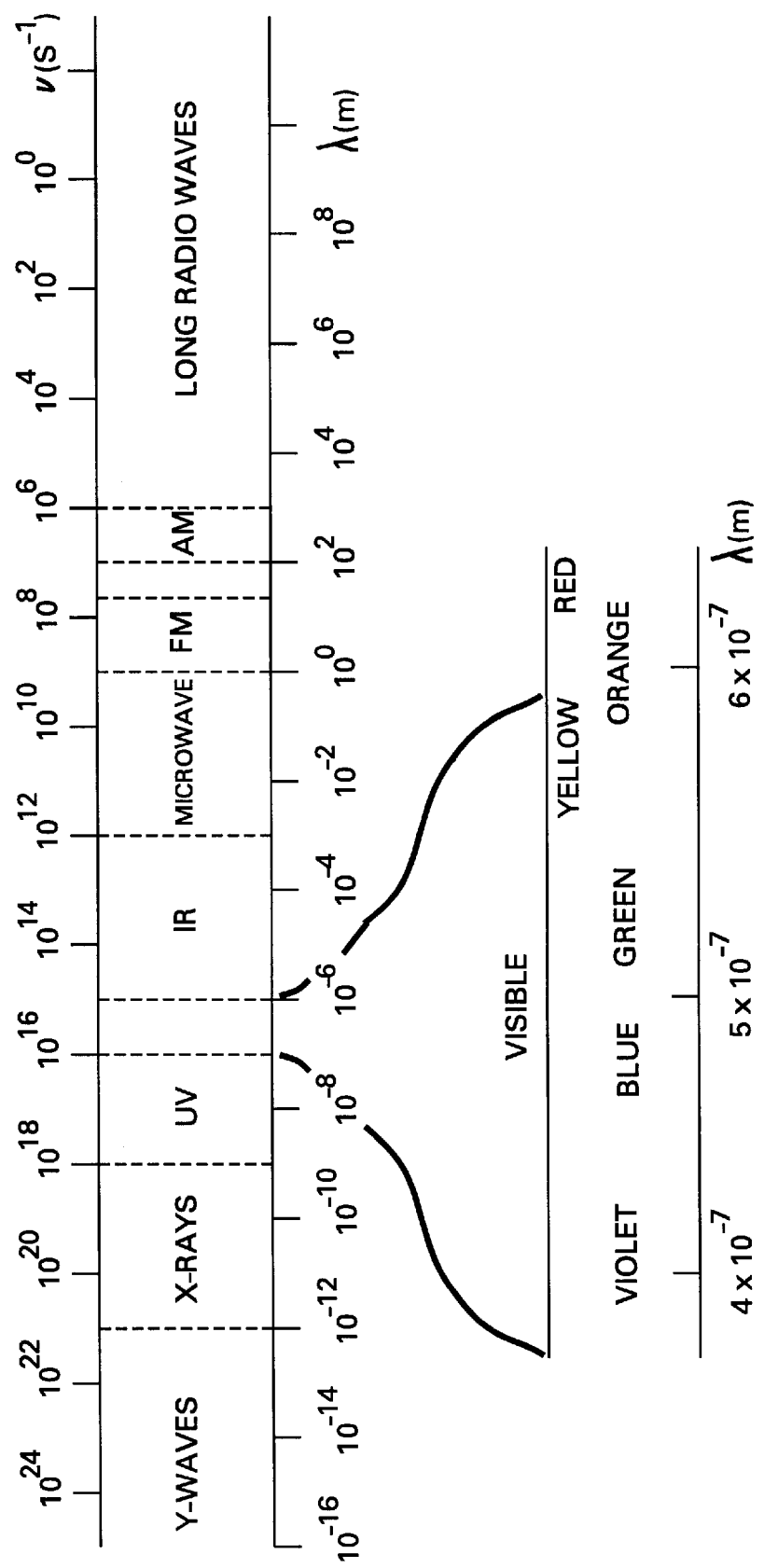
FIG. 1 is a graph of the electromagnetic spectrum.

The present inventor has discovered that the problems of the prior art ZnO/Ag/ZnO/glass multi-layer film or structure may be overcome in various ways, including replacing ZnO with a doped zinc oxide, or applying the zinc oxide layers by arc plasma deposition with an evaporated zinc source.

The present inventor has discovered that IZO exhibits superior adhesion and weather resistance compared to ZnO layers of the prior art, and superior UV absorption capabilities compared to $TiO_2$. When IZO layers were deposited directly on polymeric substrates, the IZO layers suffered only a negligible decrease in optical density ("OD", also known as "absorbance") and showed no increase in haze after being subjected to a UV accelerated weathering test for 300 or 1000 hours.

Therefore, the IZO/Ag/IZO structure is suitable for polymeric substrates such as vehicle windows, unlike the prior art ZnO/Ag/ZnO and TiO$_2$/Ag/TiO$_2$ structures used on glass. The IZO/Ag/IZO structure does not delaminate from a polymeric substrate or become hazy after exposure to water. The IZO/Ag/IZO structure is also a superior UV absorber, and protects the polymeric substrate from turning yellow.

Furthermore, the IZO/Ag/IZO multi-layer structure or film exhibits superior reflection properties in the near IR region (wavelengths of 800 to 1500 nm) compared to TiO$_2$/Ag/TiO$_2$ and CeO$_2$/Ag/CeO$_2$ structures. The IZO/Ag/IZO structure also exhibits good reflection properties in the IR region (wavelengths of 1500 to 3000 nm). Furthermore, because the IZO/Ag/IZO structure filters IR radiation by reflection, it has the added benefit of keeping the polymeric substrate (i.e. window or screen) from overheating.

Surprisingly, even though the IZO/Ag/IZO structure is a superior near IR reflector, it also has a high visible light transmission. In fact for certain selected IZO and Ag layer thicknesses, the transmission approaches that of automobile glass.

The IZO/Ag/IZO structure also provides improved chemical stability compared to uncovered Ag and Al layers, because the top IZO layer minimizes or even prevents the Ag or Al layer from oxidizing. Furthermore, unlike TiO$_2$ layers, the IZO layer is electrically conductive. Therefore, either one or both IZO layers may be used as window defogger or as a part of a damage sensor or a theft deterrence system, as described below.

The present inventor has also discovered that the stability of a ZnO layer can be improved substantially by a method of application involving arc plasma deposition with an evaporated zinc source. A ZnO layer formed by arc plasma arc deposition with an evaporated zinc source, unlike the prior art sputtered ZnO layers, has acceptable weather resistance and adhesion to a polymeric substrate.

Furthermore, improved adhesion of the ZnO layer, made by any method, to the polymeric substrate may be obtained by using a coated polymeric substrate. For example, a thin adhesion promoting layer of Al or Ag may be formed on the polymeric substrate to improve the weather resistance of the ZnO layer and the adhesion of ZnO layer to the polymeric substrate, as described in U.S. patent application, Ser. No. 09/271,657, pending entitled "Adhesion Layer for Metal Oxide UV Filters", by Charles Iacovangelo et al., filed on the same day as the present application, incorporated herein in its entirety by reference.

Another type of adhesion promoting layer which can be used to improve the weather resistance of the ZnO layer and the adhesion of the ZnO layer to the polymeric substrate is what is commonly know as a silicone hard coat. Examples of silicone hard coats are described, for example, in U.S. Pat. Nos. 4,842,941; 4,927,704; and 5,051,308, incorporated herein by reference. Silicone hard coats are also available commercially as MR7®, AS4004®, and AS4000® from the General Electric Company.

A typical silicone hardcoat is a composition comprising a dispersion of colloidal silica in lower aliphatic alcohol-water solution of the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical. Typically, at least 70 weight percent of the silanol comprises CH$_3$Si(OH)$_3$, and the composition contains 10 to 50 weight percent solids. The solids consist essentially of 10 to 70 weight percent colloidal silica and 30 to 90 weight percent of the partial condensate.

The silica component of the composition is generally present as colloidal silica. Aqueous colloidal silica dispersions generally have a particle size in the range of 5 to 150 millimicrons in diameter. The silica is dispersed in a solution of the siloxanol carried in a lower aliphatic alcohol-water cosolvent. Suitable lower aliphatic alcohols include methanol, ethanol, isopropanol, and t-butyl alcohol, for example.

While the IZO/Ag/IZO UV absorption and IR reflection structure on a polymeric substrate is preferred, the present invention is not limited to IZO and Ag layers. For example, the Ag layer may be replaced by another IR reflecting layer, such as Al and one or both IZO layers may be replaced by TiO$_2$, CeO$_2$, ZnO, or ZnO doped with one of the following dopants: fluorine, boron, aluminum, gallium, thallium, copper, and iron, for example. Therefore, other embodiments of the invention include, but are not limited to, the following structures, with the first named layer being the top layer: IZO/Ag/IZO, IZO/Al/IZO, ZnO/Ag/IZO, ZnO/Al/IZO, IZO/Ag/ZnO, IZO/Al/ZnO, ZnO/Ag/ZnO and ZnO/Al/ZnO. The last four structures also preferably contain an adhesion promoting layer between the bottom ZnO layer and the substrate. However, the IZO layer deposited directly on polymeric substrates generally has sufficient adhesion strength to the substrate to be used without an adhesion promoting layer. Furthermore, the present invention also includes a structure defined as X/Y/Z, where X is TiO$_2$, ZnS, CeO$_2$, ZnO, or ZnO doped with one of the following dopants: indium, aluminum, fluorine, boron, gallium, thallium, copper, and iron; Y is Al or Ag, and Z is TiO$_2$, ZnS, CeO$_2$, ZnO, or ZnO doped with one of the following dopants: indium, aluminum, fluorine, boron, gallium, thallium, copper, and iron.

The substrate, according to exemplary embodiments of the invention, typically comprises a polymer resin. For example, the substrate may comprise a polycarbonate. Polycarbonates suitable for forming the substrate are well-known in the art and generally comprise repeating units of the formula:

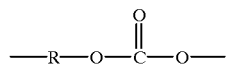

where R is a divalent aromatic radical of a dihydric phenol (e.g., a radical of 2,2-bis(4-hydroxyphenyl)-propane, also known as bisphenol A) employed in the polymer producing reaction; or an organic polycarboxylic acid (e.g. terphthalic acid, isophthalic acid, hexahydrophthalic acid, adipic acid, sebacic acid, dodecanedioic acid, and the like). These polycarbonate resins are aromatic carbonate polymers which may be prepared by reacting one or more dihydric phenols with a carbonate precursor such as phosgene, a haloformate or a carbonate ester. One example of a polycarbonate which can be used is polycarbonate LEXAN®, manufactured by the General Electric Company.

Aromatic carbonate polymers may be prepared by methods well known in the art as described, for example, in U.S. Pat. Nos. 3,161,615; 3,220,973; 3,312,659; 3,312,660; 3,313,777; 3,666,614; 3,989,672; 4,200,681; 4,842,941; and 4,210,699, all of which are incorporated herein by reference.

The substrate may also comprise a polyestercarbonate which can be prepared by reacting a carbonate precursor, a dihydric phenol, and a dicarboxylic acid or ester forming derivative thereof. Polyestercarbonates are described, for example, in U.S. Pat. Nos. 4,454,275; 5,510,448; 4,194,038; and 5,463,013.

The substrate may also comprise a thermoplastic or thermoset material. Examples of suitable thermoplastic materials include polyethylene, polypropylene, polystyrene, polyvinylacetate, polyvinylalcohol, polyvinylacetal, polymethacrylate ester, polyacrylic acids, polyether, polyester, polycarbonate, cellulous resin, polyacrylonitrile, polyamide, polyimide, polyvinylchloride, fluorine containing resins and polysulfone. Examples of suitable thermoset materials include epoxy and urea melamine.

Acrylic polymers, also well known in the art, are another material from which the substrate may be formed. Acrylic polymers can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used.

Polyesters can also be used to form the substrate. Polyesters are well-known in the art, and may be prepared by the polyesterification of organic polycarboxylic acids (e.g., phthalic acid, hexahydrophthalic acid, adipic acid, maleic acid, terphthalic acid, isophthalic acid, sebacic acid, dodecanedioic acid, and the like) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes are well-known in the art, and are prepared by the reaction of a polyisocyanate and a polyol. Examples of useful polyisocyanates include hexamethylene diisocyanate, toluene diisocyanate, MDI, isophorone diisocyanate, and biurets and triisocyanurates of these diisocyanates. Examples of useful polyols include low molecular weight aliphatic polyols, polyester polyols, polyether polyols, fatty alcohols, and the like.

Examples of other materials from which the substrate may be formed include acrylonitrile-butadiene-styrene, glass, VALOX® (polybutylenephthalate, available from General Electric Co.), XENOY® (a blend of LEXAN® and VALOX®, available from General Electric Co.), polyestercarbonate (PPC), polyethersulfone (PES) (sold under the trademark "Radel®" by Amoco), polyetherimide (PEI or polyimide) (sold under the trademark "Ultem®" by the General Electric Company), and the like.

The substrate can be formed in a conventional manner, for example by injection molding, extrusion, cold forming, vacuum forming, blow molding, compression molding, transfer molding, thermal forming, and the like. The article may be in any shape and need not be a finished article of commerce, that is, it may be sheet material or film which would be cut or sized or mechanically shaped into a finished article. The substrate may be rigid or flexible. The substrate may be transparent or not transparent.

Furthermore, while the preferred application of the present invention is glazing of polymeric car widows, the IR reflecting and UV absorption layers of the present invention may be used in other applications, such as building windows, airplane and boat windows, architectural materials, manufacturing apparatus portholes (e.g. viewing areas that allow the user to look inside metal or industrial manufacturing apparatus) and display device screens, such as television, LCD and plasma display screens.

Figure 2A:
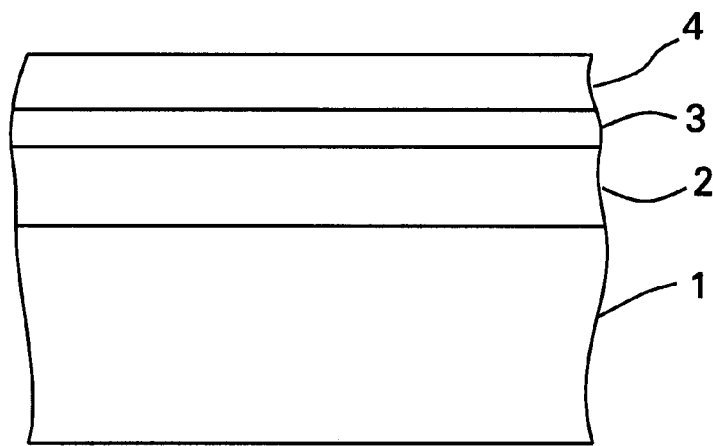
FIG. 2A is a side cross sectional view of a glazed substrate according to a preferred embodiment of the present invention.

A preferred embodiment of the present invention is shown in FIG. 2A. A substrate 1 is coated with a lower UV absorption layer 2, an IR reflection layer 3 and an upper UV reflection layer 4. The thickness of each layer is not necessarily to scale. Preferably, the substrate 1 comprises a clear polymeric material, such as PC, PPC, PES, PEI or acrylic, layers 2 and 4 preferably comprise IZO, and layer 3 preferably comprises Ag.

Figure 2B:
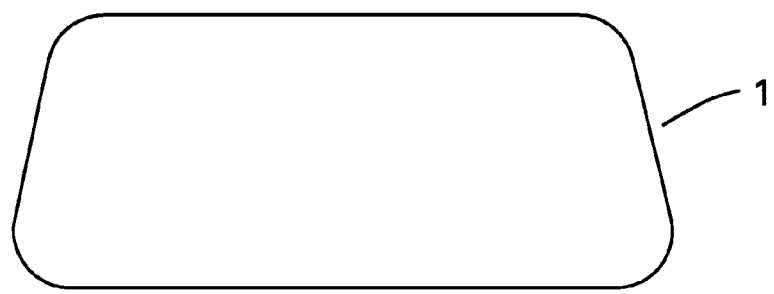
FIG. 2B is a plan view of the substrate shaped for use as a vehicle window.

The substrate is preferably a vehicle window, such as a car, truck, motorcycle, tractor, boat or airplane window, as shown in FIG. 2B. The substrate may also comprise a display screen, such as a television screen, an LCD screen, a computer monitor screen, a plasma display screen or a glare guard for a computer monitor. These screens also benefit from being coated with a UV absorption and IR reflection layers to prevent the screen from turning yellow and to prevent UV radiation and heat from damaging electronic components inside the display.

The thickness of layers 2, 3 and 4 may be controlled to alter the peak wavelength for transmission in the visible range so that it coincides with the wavelength at which the human eye is most sensitive (e.g. 550 nm). The thickness of the Ag or Al may be selected to control the percent transmission in the visible and reflection in the IR. With slight variation in the selected thickness, the coating can be tailored to match a range of automotive glass applications from typical light green glass to privacy glass.

For example, the thickness of layers 2 and 4 may suitably be between 40 and 70 nm, preferably between 47 and 66 nm, and the thickness of layer 3 expediently may be between 15 and 30 nm, preferably 20–25 nm. Typically, layers 2 and 4 have the same thickness. However, these layers may have a different thickness.

Indium may suitably comprise 2 to 15 atomic percent of the total metal content of IZO layers 2 and 4, such that the material has the following atomic composition: $In_{0.02-0.15}ZN_{0.98-0.85}O$. It was conventionally thought that IZO loses its UV absorption edge (i.e. fails to absorb UV radiation) if its indium content exceeds 3 atomic percent of the total metal content. However, the present inventor determined that IZO layers formed according to the method of the present invention maintain their UV absorption edge when their indium content is up to 15 atomic percent of the total metal content. This discovery provides several advantages. First, because IZO is electrically conductive, it may serve as both a UV absorbing layer and as a conductor of electricity. For example, the IZO layer of the present invention may be used as a window defogger on an automobile window because each IZO layer is invisible to the naked eye. Another application of the IZO layer may be as a part of a theft or damage sensor. A window coated with the IZO layer may carry a low current passed through the IZO layer. When a window is cracked or chemically etched, the current flow through the IZO is interrupted which sets off an alarm indicating a crack or chemical damage to the window.

Figure 3A:
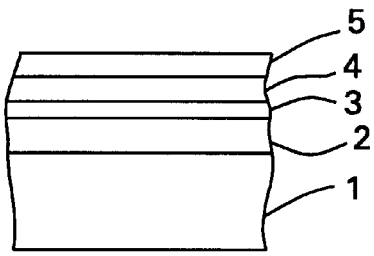
FIGS. 3A–F are side cross sectional views of a glazed substrate according to alternative embodiments of the present invention.

An alternative embodiment of the present invention is shown in FIG. 3A. In this embodiment, an optional scratch or abrasion resistant layer 5 is formed over the UV absorption layer 4. The abrasion resistant layer 5 minimizes or even prevents the UV absorption layer 4 from being scratched during use. The abrasion resistant layer 5 may comprise, for example, a plasma polymerized organosilicon material, as described in U.S. patent application, Ser. No. 09/271,654, entitled "Multilayer Article and Method of Making by Arc Plasma Deposition", by Iacovangelo et al., filed on the same day as the present application, which is hereby incorporated by reference. The organosilicon material may comprise, for example, octamethylcyclotetrasiloxane (D4) tetramethyldisiloxane (TMDSO), hexamethyldisiloxane (HMDSO), or other organosilicon, as described in the above application. The organosilicon monomers are oxidized, decomposed, and polymerized in an arc plasma deposition apparatus, typically with a stoichiometric excess oxygen, to form an abrasion resistant layer which comprises an oxidized D4, TMDSO, or HMDSO layer, for example. Such an abrasion resistant layer may be referred to as an $SiO_x$ layer. However, the $SiO_x$ layer may also contain hydrogen and carbon atoms in which case it is generally referred to as $SiO_xC_yH_z$.

Other examples of materials suitable for the abrasion-resistant material include silicon dioxide and aluminum oxide, for example.

Figure 3B:
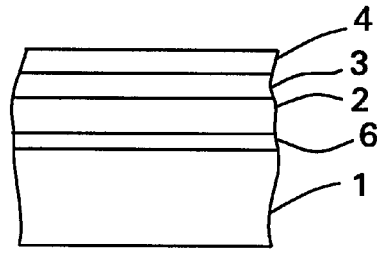

Another embodiment of the present invention is shown in FIG. 3B. In this embodiment, an interlayer 6 is formed between the substrate 1 and the UV absorption layer 2. The interlayer relieves stress between the substrate 1 and the overlying layers. The stress may occur for many reasons. For example, it may occur due to different coefficients of thermal expansion, different ductility, and different elastic moduli of the substrate 1 and the overlying layers. Preferably, the interlayer 6 comprises a material which has a value of coefficient of thermal expansion, ductility, and elastic modulus which is between the corresponding values of the substrate and the overlying layers. One example of an interlayer material is a plasma polymerized organosilicon, as described in the above-referenced U.S. patent application, Ser. No. 09/271,654, entitled "Multilayer Article and Method of Making by Arc Plasma Deposition".

Figure 3C:
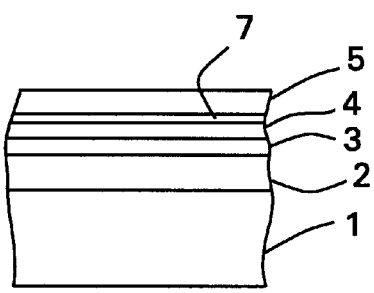
Figure 3D:
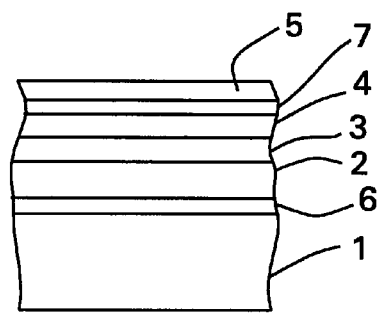
Figure 3E:
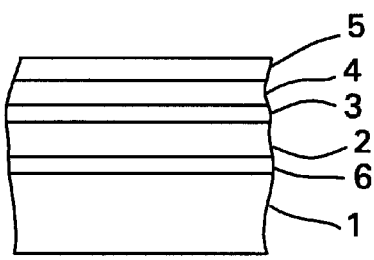

In another embodiment of the present invention, a second interlayer 7 may be formed between the top UV absorption layer 4 and the abrasion resistant layer 5, as shown in FIG. 3C. Interlayer 7 relives stress between layers 4 and 5 that occurs due to different coefficients of thermal expansion, different ductility, and different elastic modulus of layers 4 and 5. Interayer 7 may comprise aluminum or a polymerized organosilicon, for example. Interlayer 7 may be used together with interlayer 6, as shown in FIG. 3D. However, the interlayer 7 is optional, and may be omitted, even when layers 5 and 6 are present, as shown in FIG. 3E.

Figure 3F:
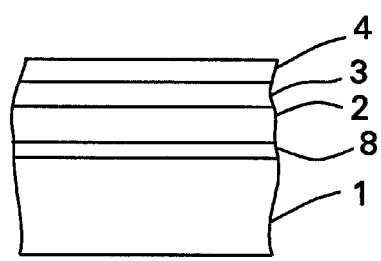

Furthermore, as discussed above, an adhesion promoting layer 8 may be formed between the substrate 1 and the UV absorbing layer 2, as shown in FIG. 3F. Adhesion promoting layer 8 may be any suitable adhesion promoting material, and preferably comprises a 10 to 40 nm thick Al, Ag or silicone hardcoat layer. Adhesion promoting layer 8 is most advantageous when UV absorbing layer 2 comprises ZnO. However, adhesion promoting layer 8 may be formed even when UV absorbing layer 2 comprises IZO. Furthermore, the adhesion promoting layer 8 may also be added directly below UV absorbing layer 2 in structures shown in FIGS. 3A–3E.

The IR reflection layer 3 may be fabricated over the substrate 1 by a variety of methods. For example, sputtering, metal organic chemical vapor deposition (MOCVD), arc plasma deposition, evaporation, and electron beam evaporation may be used to deposit IR reflecting layer 3. The preferred method of forming IR reflecting layer 3 is arc plasma deposition or DC or RF magnetron sputtering. However, non-magnetron DC, RF or microwave sputtering may also be used if desired.

The metal oxide UV absorption layers 2 and 4 may also be deposited by a variety of methods, such as CVD, evaporation (thermal, RF or electron beam), reactive evaporation, sputtering (DC, RF, microwave and/or magnetron), arc plasma deposition, and reactive sputtering. However, the last two methods are preferred.

In an arc plasma deposition process according to an exemplary embodiment of the invention, an arc is generated between a cathode and an anode which are located in a first chamber. The anode has a central aperture, typically in the form of a portion of a diverging cone, which opens into a low pressure second chamber. A plasma gas, introduced proximate to the cathode, is ionized by the arc between the cathode and anode to form a plasma. The plasma flows into the second chamber at high velocity as a plasma jet due to the pressure difference between the first and second chambers. Upon entering the second chamber, one or more reagents are fed into the plasma, which projects the reagents onto the substrate, and which also enables the reagents to undergo reactions such as polymerization, oxidation, decomposition, etc. The second chamber may include a diverging, e.g. conical, nozzle which extends from the diverging aperture of the anode. The nozzle at its narrow end concentrates the plasma and reagents to enhance the chemical reactions. At the wide end of the nozzle, the area of the plasma is substantially increased to provide a larger deposition area.

Figure 4:
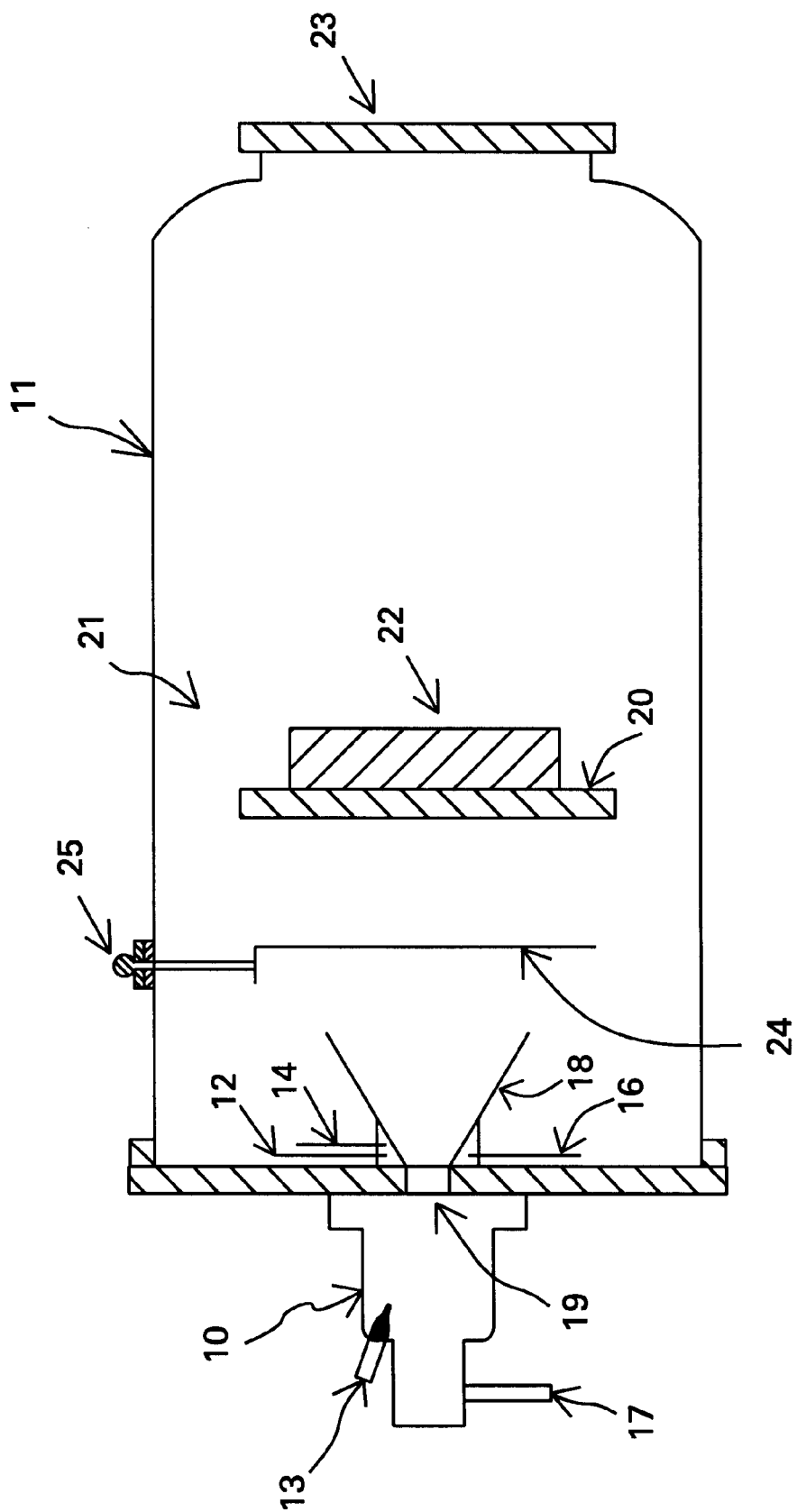
FIG. 4 is a side cross sectional view of an apparatus used to manufacture the glazed substrate according to the present invention.

An arc plasma generation apparatus for depositing the UV absorption layers 2, 4 as well as the IR reflection layer 3 according to one embodiment of the invention is shown in FIG. 4. The apparatus comprises a plasma generation chamber 10 and a deposition chamber 11. The deposition chamber 11 contains a substrate 20 mounted on a temperature controlled support 22. The substrate 20 may be a transparent polymeric substrate 1 shown in FIG. 2A. The deposition chamber also contains an outlet 23 for connection to a pump and a door (not shown) for loading and unloading the substrate 20. The support 22 may be positioned at any position within the interior 21 of deposition chamber 11. Preferably, the substrate 20 is positioned 10 to 50 cm, typically about 25 cm, from the anode.

The deposition chamber 11 also optionally comprises a retractable shutter 24. The shutter may be positioned by any suitable means, such as by a handle 25 or by a computer controlled positioning mechanism. The shutter 24 may also contain a circular aperture to control the diameter of the plasma that emanates from the plasma generation chamber 10 towards the substrate 20. The deposition chamber 11 may also optionally comprise magnets or magnetic field generating coils (not shown) adjacent to chamber walls to direct the flow of the plasma.

The deposition chamber 11 typically includes a nozzle 18. The nozzle 18 allows for greater control of the injection, ionization and reaction of the reactants to be deposited on the substrate 20. The nozzle 18 promotes the deposition of a solid metal oxide film or layer on the substrate 20 and reduces or even prevents formation of powdery reactant deposits on the substrate 20. Typically, the nozzle 18 has a conical shape with a divergent angle of about 40 degrees and a length of about 10 to 80 cm, typically about 16 cm. However, the nozzle 18 may have a variable cross section, such as conical-cylindrical-conical or conical cylindrical. Furthermore, the nozzle 18 may have a divergent angle other than 40 degrees and a length other than 16 cm. The nozzle may also be omitted entirely.

The deposition chamber 11 also contains at least one reactant supply line. For example, the deposition chamber 11 may contain an oxygen supply line 12 and a zinc supply line 14 to deposit a ZnO film on the substrate 20. The deposition chamber 11 may also contain a third indium or aluminum supply line 16 to deposit IZO or AZO. The supply lines 12, 14, 16 preferably communicate with the nozzle 18 and supply reactants into the plasma flowing through the nozzle 18. The deposition chamber 11 also contains vacuum pumps (not shown) for evacuating the chamber.

The plasma generation chamber 10 includes at least one cathode 13 and an anode 19. One embodiment of plasma generation chamber 10 is shown in more detail in FIG. 5. The plasma generation chamber 10 preferably comprises more than one cathode 13. Typically, there are three cathodes 13, but any number of cathodes may be used depending on the particular application. Each cathode 13 may comprise tungsten or thorium doped tungsten tips. The use of thorium allows the temperature of the tips to be maintained below the melting point of tungsten, thus avoiding contamination of the plasma with tungsten atoms. Each cathode 13 may be surrounded by a cathode housing 113 to isolate each cathode 13 from the walls of the cathode support plate 28. The cathode housing 113 may comprise a shell surrounding an isolating mantle made from an insulating material such as quartz.

The plasma generation chamber 10 generally includes at least one plasma gas supply line 17. The plasma generation chamber 10 may also contain a purging gas supply line adjacent to the plasma gas supply line 17 to supply a purging gas to chambers 10 and 11 prior to supplying the plasma gas.

Each cathode 13 is typically separated from the anode 19 by at least one cascade plate 26. The cascade plate(s) preferably comprise copper discs containing a central aperture which typically diverges in the shape of a cone to match the shape of the anode aperture. However, other configurations may be used.

A cathode support plate 28 may be attached to the cascade plate(s) 26 and the anode 19 by an insulated bolt 27 or by other fasteners. The cascade plate 26 is typically electrically insulated from the cathode support plate 28 and the anode 19 by spacers 15. Spacers 15 may comprise any suitable material, for example O-ring vacuum seals, polyvinylchloride rings and/or boron nitride rings.

Figure 5A:
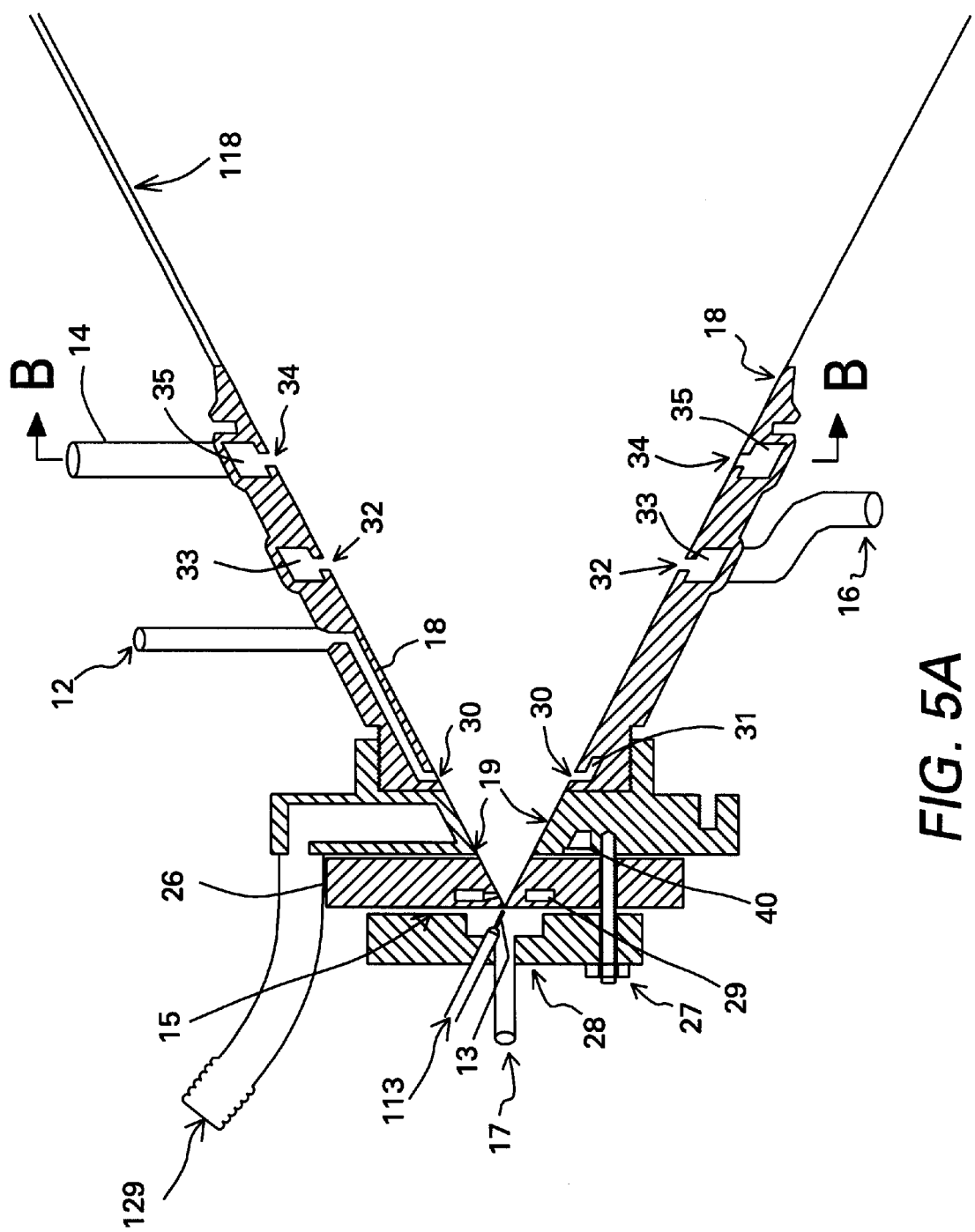
FIG. 5A is a side cross sectional view of a portion of the apparatus shown in FIG. 4.

Plasma discharge at high power density and high temperature tends to heat the cascade plate(s) 26 and anode 19. Preferably, the cascade plate(s) 26 and anode 19 contain coolant channels 29 and 40, respectively. The channels 29, 40 typically have a circular shape within the bulk of the plate(s) 26 and anode 19, as shown in FIG. 5A. Coolant, such as chilled water supplied through a water supply line 129 flows through the channel 40 to cool the anode 19 during operation. A similar water supply line (not shown) is provided to supply water to the channel 29.

The nozzle 18 is preferably attached to the anode 19. The nozzle 18 may contain an integral or removable divergent portion 118 for directing the plasma and reactive species flow. Preferably, the reactant supply line(s) 12, 14 and 16 are in contact with the nozzle 18. The nozzle 18 may contain a showerhead inlet supply line which comprises a ring shaped reactant supply channel(s) connected to injection holes. For example, as shown in FIG. 5C, reactant supply line 14 connects to reactant supply channel 35 formed inside the body of the nozzle 18. Reactant supply channel 35 contains a plurality of openings 34, which are preferably evenly distributed around the circumference of channel 35. The reactant flows from line 14 into the channel 35. The reactant then flows from the channel 35 simultaneously through openings 34 to enter the plasma, emanating from anode 19 into deposition chamber space 21, from several directions. Likewise, supply line 16 is connected to channel 33 and inlet openings 32 and supply line 12 is connected to channel 31 and inlet openings 30. However, the channel and openings may be omitted and the supply lines may deposit the reactants directly into the plasma, if desired.

To form a plasma in the plasma generation chamber 10, a plasma gas is supplied through plasma gas supply line 17. The plasma gas may comprise any suitable gas, such as any noble gas, nitrogen, ammonia, carbon dioxide or hydrogen or any mixture thereof. If there is more than one plasma gas, then the plural gasses may be supplied through plural supply lines. Preferably, the plasma gas comprises argon or a combination of argon and oxygen. The plasma gas in plasma generation chamber 10 is maintained at a higher pressure than the pressure in the deposition chamber 11, which is continuously evacuated by a pump. A voltage is then applied between the cathode(s) 13 and the anode 19 to generate a plasma in the plasma generation chamber 10. The plasma then flows through the aperture of the anode 19 into the deposition chamber 11 due to the pressure difference between chambers 10 and 11.

The reactants are supplied into the plasma through supply lines 12, 14, 16. For example, oxygen gas may be supplied through line 12, zinc may be supplied through line 14 and indium or aluminum may be supplied through line 16 to form an IZO or AZO film 2 on the substrate 20. However, line 16 may be sealed or inactive if a ZnO film is to be deposited. Zinc and indium or aluminum may be supplied through the same line (14 or 16). Of course the supply line location may be altered, and oxygen may be supplied through line 14 or 16, etc.

Zinc, indium, and aluminum reactants may be supplied though a supply line in the form of metal organic gases which disassociate in the plasma stream, such as diethyl zinc (DEZ), dimethyl zinc (DMZ), triethyl indium (TEI), trimethyl indium (TMI), triethyl aluminum (TEA) or trimethyl aluminum (TMA).

Preferably, the zinc, indium and/or aluminum reactants are supplied in the form of a vapor. To generate a metal vapor, the metal supply line may be altered, for example as shown in FIG. 6A. The metal supply line 14 (or 12 or 16, as necessary) may be replaced by a tube 44, such as a stainless steel tube. The tube 44 is attached to a crucible 45, such as a nickel crucible with a tantalum liner. The crucible is surrounded by a heating element 47, such as a high resistance wire or RF coils. The heating element is also wrapped around the tube 44. The heating element is kept at a temperature sufficient to prevent the metal from solidifying in the tube 44. Preferably, the heating element 47 also extends to the injecting nozzle 18 to prevent the metal from solidifying therein.

The metal reactant 48 is preferably loaded into the crucible 45 such that the reactant abuts the pipe 44. The heating element is activated to evaporate the metal reactant 48 into the pipe 44. The metal reactant is then fed into the plasma 50 from pipe 44 through channel 35 and openings 34. To deposit a ZnO film, the metal reactant may be zinc. To deposit an IZO film, the metal reactant 48 may be an In:Zn alloy, such as 2.5 atomic % In:Zn alloy. To deposit an AZO film the metal reactant may be an Al:Zn alloy. Alternatively, the metal reactant may be evaporated from a continuously supplied metal wire. The details of pressure, temperature and other parameters are described in U.S. patent application, Ser. No. 09/271,655, entitled "Method and Apparatus for Arc Plasma Deposition with Evaporation of Reagents", by Iacovangelo et al., filed on the same day as the present application, which is hereby incorporated in its entirety by reference.

Alternatively, indium or aluminum vapor may be supplied through a conduit separate from the zinc vapor conduit. In this embodiment, the second metal supply line 16 is replaced with a second tube 46 and a second crucible containing indium or aluminum. The zinc and indium or aluminum vapor enter the plasma, where it mixes with oxygen supplied through supply line 12. The metal and oxygen reactants mix in the plasma 50 to form IZO or AZO which deposits on the substrate 20 as a thin film as the plasma strikes the substrate.

Figure 6B:
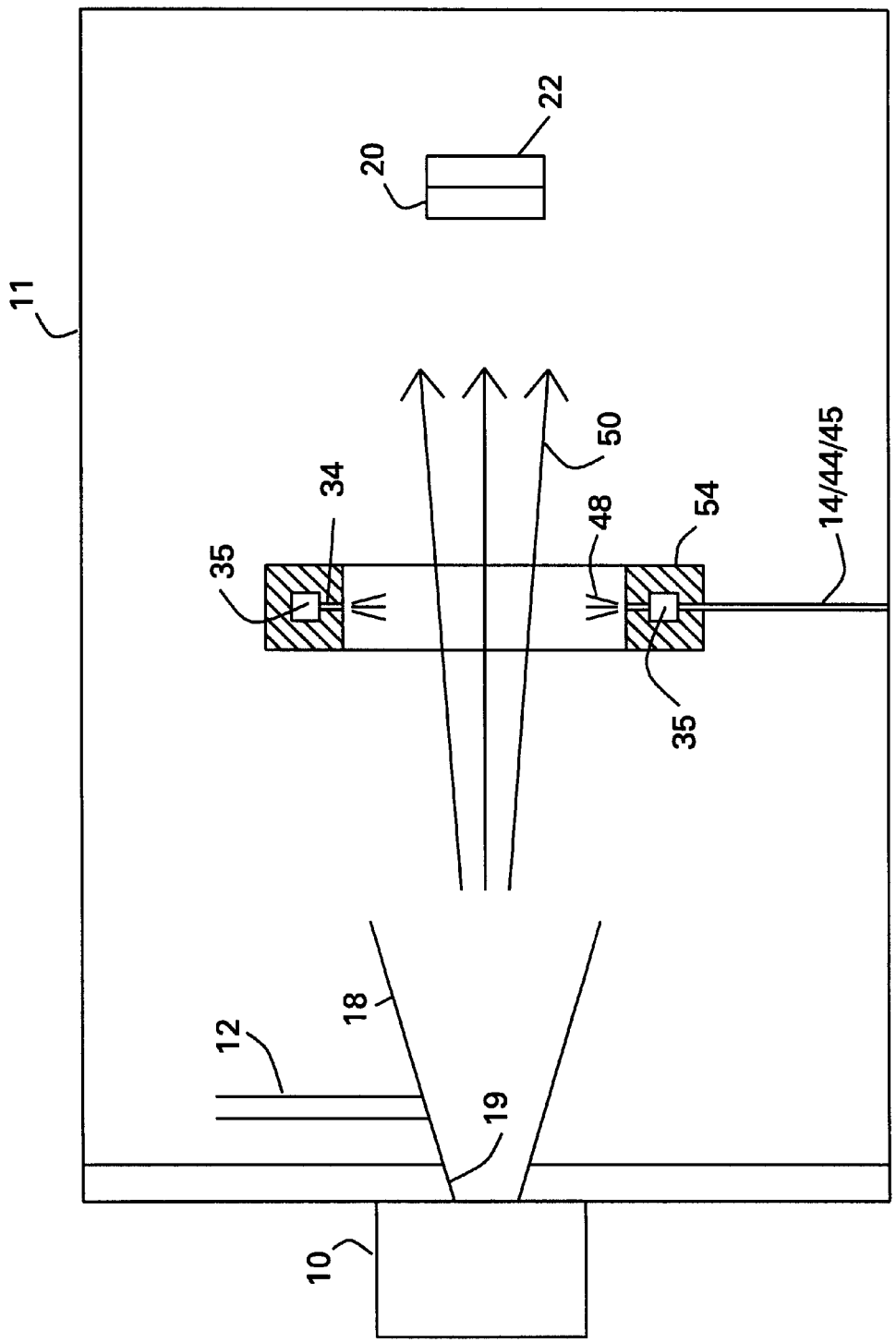

In an alternative embodiment, at least one reactant inlet, such as a metal reactant inlet 54, may be located distal from the anode 19, as shown for example in FIG. 6B. The inlet 54 may have a ring shape with a wide aperture in the center of the ring. The inlet preferably contains a reactant supply channel 35 and reactant supply openings 34 similar to the previous embodiment, such as the ones shown in FIG. 5C. The plasma 50 passes through the aperture in the inlet 54. The reactant is supplied to channel 35 through a supply line 14 if the reactant is a gas or through a pipe 44 and crucible 45 if the reactant is a vapor. The reactant 48 enters the plasma 50 from plural openings 34. In this embodiment, the nozzle 18 may be omitted because the inlet 54 controls the shape and direction of the plasma 50.

Figure 6C:
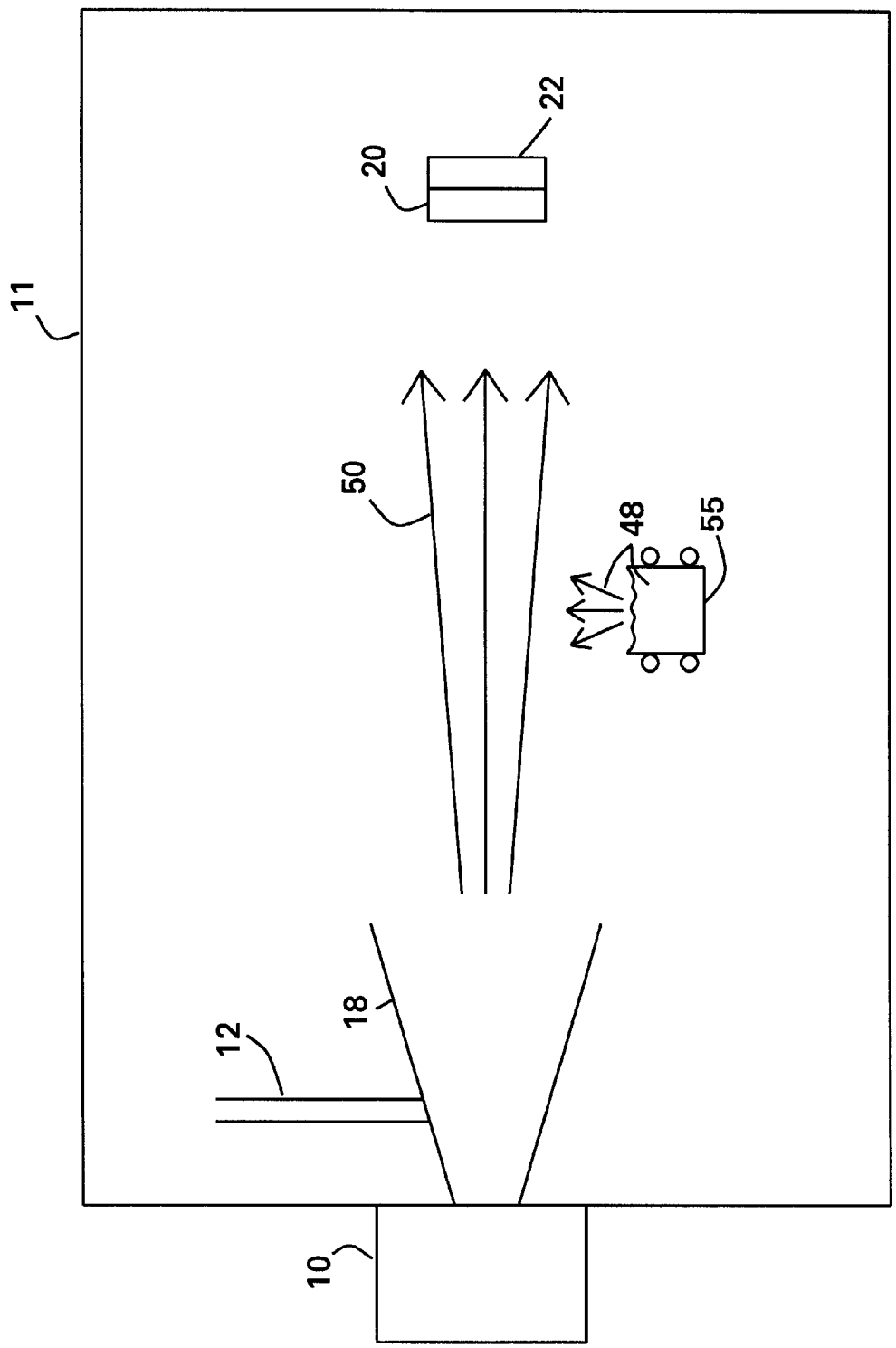

In another embodiment, the reactant inlet may comprise a crucible 55, as shown for example in FIG. 6C. Solid Zn, In:Zn, or Al:Zn alloys 48 may be evaporated from the crucible 55 directly into the plasma 50.

Figure 6D:
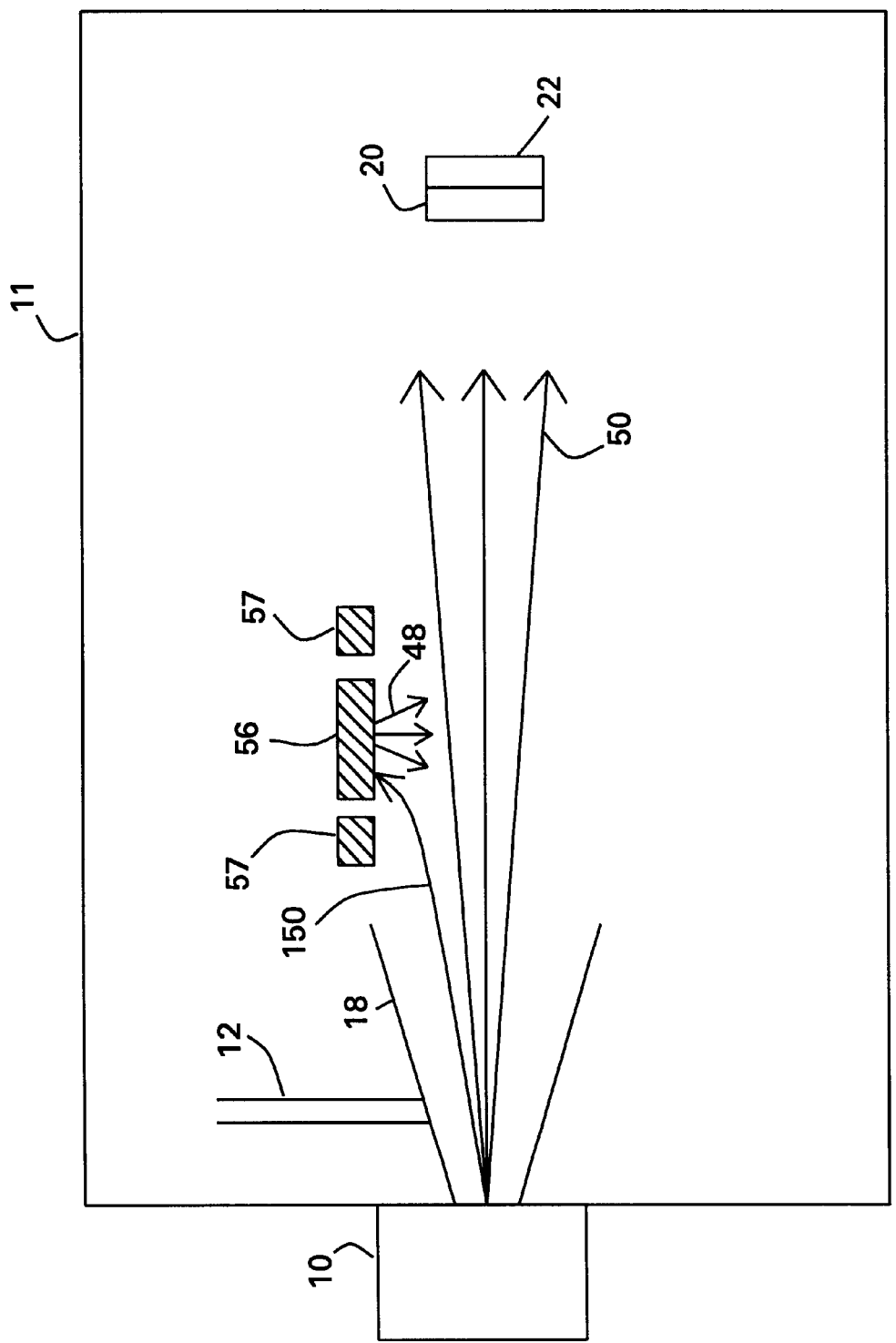

In yet another embodiment, the reactant source may comprise a biased sputtering target 56 (e.g. cathode) adjacent to a biased anode 57, as shown for example in FIG. 6D. Edge portions of the plasma 150 are drawn to the biased target 56 and sputter off target atoms 48, that drift into the main portion of the plasma 50. The reactant atoms combine in the plasma and are deposited on the substrate 20 by the plasma. The target 56 may comprise any suitable material, such as Zn, In:Zn, Al:Zn, ZnO, IZO or AZO. If the target 56 contains oxygen, then a separate source of oxygen may be omitted. Likewise, the nozzle 18 may be omitted.

Figure 6E:
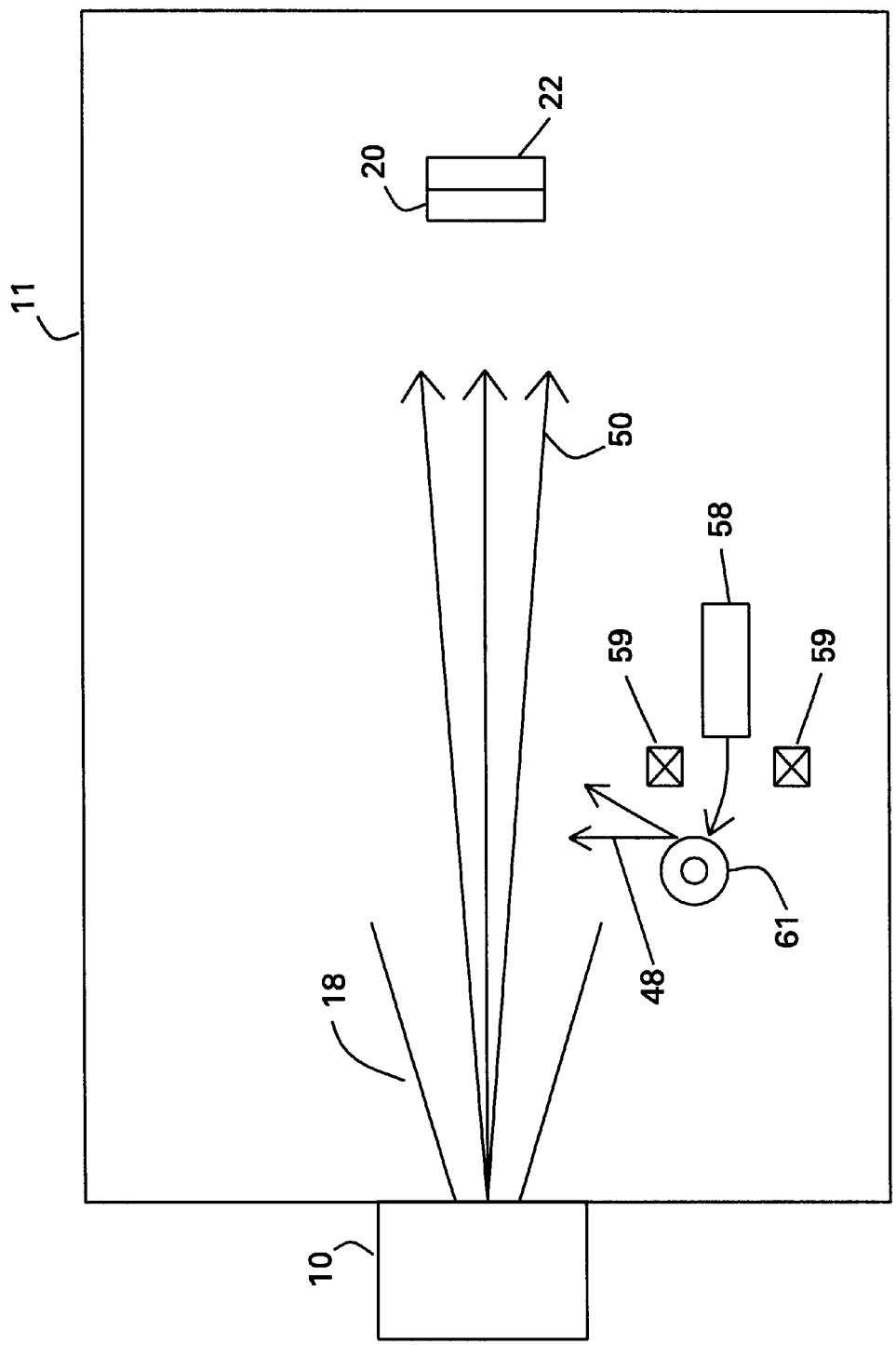

In another embodiment, the reactant source comprises an electron beam evaporation system, as shown for example in FIG. 6E. An electron gun 58 emits a beam of electrons 60. The electron beam is directed toward a reactant target 61 by magnet(s) 59. As the electron beam 60 strikes the reactant target 61, it evaporates reactant atoms 48 from the reactant target. Preferably, the reactant target is a rotating wheel to allow uniform reactant release from the target 61. The reactant atoms 48 migrate toward the plasma 50 to be deposited on the substrate 20. The target 61 may comprise Zn, In:Zn, Al:Zn, ZnO, IZO or AZO, for example. If the target 61 contains oxygen, then a separate source of oxygen may be omitted. Likewise, the nozzle 18 may be omitted.

In another embodiment of the present invention, both the IR reflecting layer 3 and the UV absorption layers 2 and 4 are formed in the same arc plasma deposition apparatus. Preferably, the IR reflecting layer 3 comprises Ag or Al and the UV absorbing layers 2 and 4 comprise IZO. However, the UV absorbing layers 2 and 4 may comprise AZO or ZnO or another metal oxide layer. In one aspect of this embodiment, the Ag or Al layer may be formed by supplying Al or Ag reactant through one of the reactant supply pipes. For example, as shown in FIG. 5A, Ag may be supplied through line 16, Zn and In may be supplied through line 14 and oxygen through line 12. First, Zn and In flow is supplied from line 14 and oxygen flow is supplied from line 12, while line 16 is shut off or remains inactive. The Zn, In and oxygen reactants enter an inert gas plasma 50, such as an Ar plasma, and mix therein to form IZO. The reactants deposit as an IZO layer 2 when the plasma strikes the substrate 20. Thereafter, Ag is supplied through line 16 with the other supply lines being inactive or shut off. The Ag reactant enters plasma 50, and the plasma deposits an Ag layer 3 on the substrate 20. Thereafter, the flow of Ag is stopped, and Zn, In and oxygen flow is started from lines 14 and 12 to form a second IZO layer 4 on the IR reflecting layer 3. A purging gas, such as nitrogen, may be flown through chambers 10 and 11 between depositions of each layer.

The source of Ag or Al for the IR reflecting layer 3 may be similar to the Zn and In sources used for deposition of the UV absorbing layers 2 and 4. For example, if Al is used as the IR reflecting layer 3, then an organometallic gas, such as trimethyl aluminum (TMA) or triethyl aluminum (TEA) may be used to deposit Al layer 3. Organometallic refers to an organic compound comprising a metal attached directly to a carbon. Alternatively, if IR reflecting layer 3 comprises Ag or Al, then Ag or Al may be evaporated from a crucible such as those shown in FIGS. 6A and 6C. This crucible should be formed in addition to the Zn and In crucible 45 if it is desired to evaporate Zn and In. Alternatively, Ag or Al reactant may be sputtered or e-beam evaporated into the plasma from a target, such as those shown in FIGS. 6D and 6E.

It should be apparent that any combination of metal sources shown in FIGS. 5A and 6A–E may be used to deposit the IZO layers 2 and 4 and the Ag or Al layer 3. For example, Zn and In may be evaporated from crucible 45 through pipe 44, while Ag or Al may be evaporated from a second crucible through pipe 46 or from crucible 55, or vise versa. Alternatively, Zn and In may be evaporated from crucible 45, while Ag or Al may be sputtered or evaporated from targets 56 or 61 or vise versa. Furthermore, ZnO or AZO layers may be used instead of the IZO layers.

Furthermore, the abrasion resistant layer 5, the interlayer(s) 6 and/or 7 and the adhesion promoting layer 8, if any are utilized in the structure, may be formed in the same chamber as layers 2, 3 and 4. A silicon dioxide or alumina abrasion resistant layer 5 may be deposited by supplying oxygen and silicon or aluminum reactants into the plasma, as described in U.S. Pat. No. 6,110,544 by Barry Yang et al., entitled "Protective Coating by High Rate Arc Plasma Deposition", filed Mar. 9, 1998, incorporated herein by reference in its entirety. The plasma polymerized organosilicon interlayer(s) 6, 7 may be deposited by introducing appropriate organosilicon monomers into the plasma, as described in the above-referenced U.S. patent application, Ser. No. 09/271654. The Al or Ag adhesion promoting layer 8 may be deposited by supplying Al or Ag gas or vapor into the plasma arc in a manner similar to the deposition of the IR reflecting layer 3. If the adhesion promoting layer 8 comprises Ag, then the same Ag reactant source may be used to deposit both the IR reflecting layer 3 and the adhesion promoting layer 8. A purging gas may be flown through deposition chamber 11 between depositions of each layer. Deposition of several layers in the same chamber increases process throughput and decreases process cost.

Figure 7:
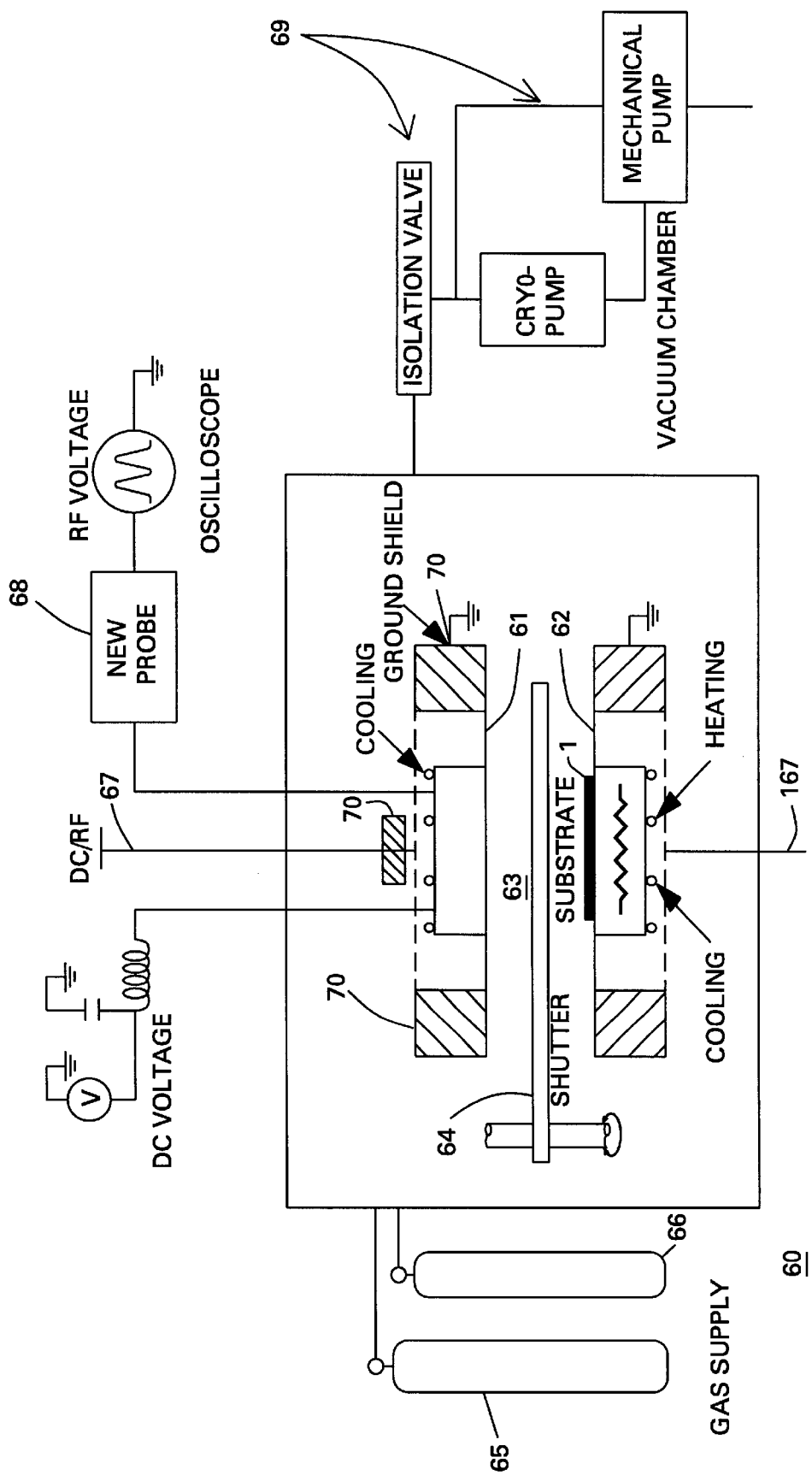
FIG. 7 is a side cross sectional view of an apparatus used to manufacture the glazed substrate according to another embodiment of the present invention.

In an alternative embodiment, the UV absorption layers 2 and 4 are formed by reactive sputtering, as shown for example in FIG. 7. The reactive sputtering apparatus 60 preferably comprises a reactant target 61, a substrate support 62, a plasma reaction space 63 between the support and the target, an optional shutter 64 that separates the target from the support, a plasma gas supply tank 65, a reactant gas supply tank 66 for reactive sputtering, and DC or RF voltage supply lines 67 and 167. The apparatus may optionally comprise a testing probe/oscilloscope 68. The apparatus is preferably evacuated by at least one mechanical and/or cryopump 69. The target 61 may be cooled by flowing water on its back side. The support 62 may be heated, cooled or biased as required. In case more precise control of the plasma is desired, magnets 70 may be placed above or adjacent to the target 61 to form a DC or RF magnetron sputtering apparatus.

To form IZO layers 2 and 4, the target 61 preferably comprises solid IZO containing 0–15 weight %, preferably 1.5 weight % In, and the sputtering gas comprises Ar or a mixture of Ar and oxygen. By using a 1.5 weight percent In target, an IZO layer containing 2.5 atomic percent In may be formed. However, the target may comprise In:Zn of the same In content as the IZO target, and the sputtering gas may comprise a mixture of Ar and oxygen (i.e. the IZO layers may be formed by reactive sputtering). To form ZnO or AZO layers 2 or 4, a Zn, ZnO, Al:Zn or AZO target may be used. The chamber 63 is typically pumped down by pump(s) 69. A sputtering gas such as Ar is filled into space 63 from gas supply tank 65. A DC or RF voltage is applied to the target, which causes the sputtering gas to form a plasma. The plasma atoms and ions bombard the target due to the negative charge applied to the target. The plasma bombardment causes reactant atoms to be sputtered off from the target 61 and to drift toward the substrate 1 on the support 62. Alternatively, adjacent but separate Zn and In or Al targets may be used to form the IZO or AZO layers 2 and 4.

Furthermore, by covering the target 61 with shutter 64 and applying a negative charge to the support 62, the Ar plasma may be used to bombard the substrate 1. This causes the plasma to sputter clean the substrate 1 or any layers thereon prior to depositing layer 2. This increases process throughput by eliminating a separate cleaning step in a separate chamber.

Figure 8:
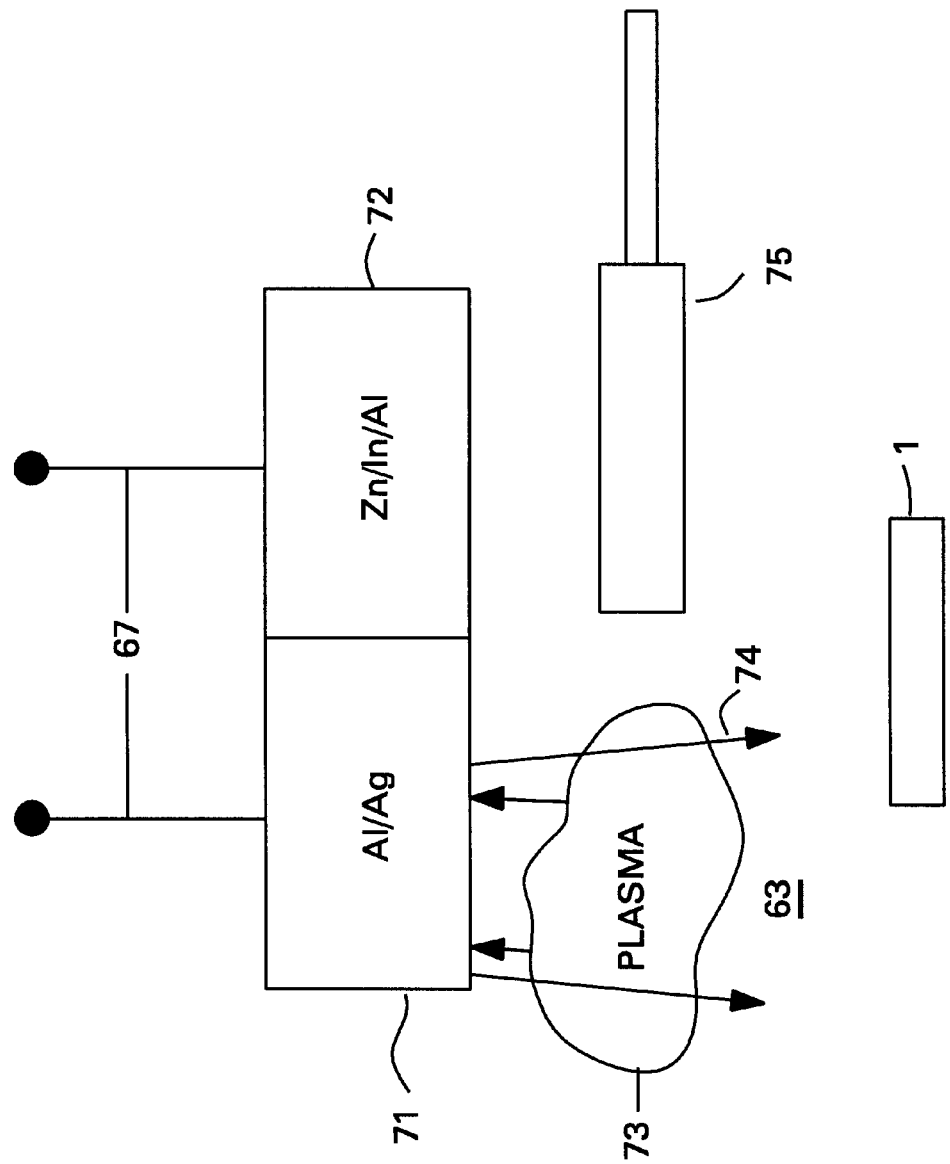
FIG. 8 is a side cross sectional view of an apparatus used to manufacture the glazed substrate according to another embodiment of the present invention.

In another embodiment, layers 2, 4 and 3 may be deposited in the same sputtering chamber, as shown for example in FIG. 8. The target may comprise an Ag portion 71 and an In:Zn or an IZO portion 72. Alternatively, there may be two or more separate targets 71 and 72. The target may comprise an Al portion 71 instead of an Ag portion and a Zn, Al:Zn or AZO portion 72 instead of an In:Zn portion if layers 2 or 4 comprise ZnO or AZO, and/or layer 3 comprises Al.

First, DC or RF voltage is applied only to target portion 72, while portion 71 may be covered with a shutter 75. Alternatively, if there is only one voltage supply line 67 to both target portions 71 and 72, portion 71 is simply covered by shutter 75. The plasma 73 bombards only target portion 72 to sputter off Zn, In and oxygen atoms to form an IZO layer 2 on or over the substrate 1.

The support is then positively biased to sputter clean layer 2 using the Ar plasma 73. The substrate 1 may be similarly cleaned before depositing layer 2. However, the cleaning step(s) may be omitted.

Second, DC or RF voltage is applied to target portion 71, while portion 72 may be covered with a shutter 75. Alternatively, if there is only one voltage supply line 67 to both target portions 71 and 72, then portion 72 is simply covered by shutter 75. The plasma 73 only bombards the uncovered target portion 71, causing only Ag atoms 74 to be sputtered toward the substrate 1. Thus, the Ag film 3 is sputter deposited on substrate 1.

After another optional cleaning step, the target portion 72 is positively biased, while target portion 71 is either unbiased, covered by shutter 75 or both. The plasma 73 bombards only target portion 72 to sputter off Zn, In and oxygen atoms to form an IZO layer 4 on Ag layer 3. As noted above, layer 4 may also comprise AZO or ZnO. Forming layers 2, 3 and 4 and carrying out sputter cleaning in the same chamber greatly enhances process speed and throughput.

Furthermore, the abrasion resistant layer 5 and the adhesion promoting layer 8 may also be formed in the same apparatus as layers 2, 3 and 4. To form an abrasion resistant layer 5, an extra sputtering target may be added to the chamber. The target may comprise silicon for reactive sputtering or silicon dioxide for inert gas sputtering to form a silicon dioxide layer 5. The target may also comprise aluminum for reactive sputtering or alumina ($Al_2O_3$) for inert gas sputtering to form an alumina layer 5. The extra targets are preferably covered by shutter 75 when layers 2, 3 and 4 are being sputtered. If the adhesion promoting layer 8 comprises Ag, then it may be sputtered from the Ag target used for forming layer 3, prior to sputtering the IZO layer 2.

Examples 1–4 described below demonstrate the optical properties of the IZO/Ag/IZO multi-layer structure. Examples 5–13 demonstrate the weather stability and adhesion of the doped or undoped metal oxide layers to the polymeric substrate. It should be understood that the examples are meant to merely illustrate the present invention and should not be deemed as limiting the scope of the claims. All metal oxide layers were formed by sputtering on uncoated glass substrates in examples 1–4 and on silicone hardcoated PC substrates (sold under the trademark MR7® by the General Electric Company) in examples 5–13. The substrates were cleaned in isopropyl alcohol and baked in vacuum at 90° C. for 12 hours prior to deposition.

EXAMPLES 1–4

Four IZO/Ag/IZO structures were made by sputtering in an argon plasma. The IZO layers were sputtered from a 1.5 weight % In:ZnO target at a power of 75 W in an argon plasma at a pressure of 2.67 Pa (20 militorr). The resulting IZO layers had an In content of about 2.5 atomic percent (e.g. $In_{0.025}Zn_{0.975}O$) and an electrical resistivity of 0.002 ohm-cm. The Ag was sputtered from an Ag target at a power of 100 W and a pressure of 1.07 Pa (8 militorr).

In the first structure, a 25 nm Ag layer 3 was formed between two 47 nm IZO layers 2 and 4. In the second structure, a 25 nm Ag layer 3 was formed between two 57 nm IZO layers 2 and 4. In the third structure, a 25 nm Ag layer 3 was formed between two 66 nm IZO layers 2 and 4. In the fourth structure, a 20 nm Ag layer 3 was formed between two 57 nm IZO layers 2 and 4. The thickness of each layer in the four structures is summarized in Table 1 below.

TABLE 1

| EXAMPLE (Line Number) | IZO Layer 4 thickness | Ag Layer 3 Thickness | IZO Layer 2 Thickness |
| --- | --- | --- | --- |
| 1 | 47 nm | 25 nm | 47 nm |
| 2 | 57 nm | 25 nm | 57 nm |
| 3 | 66 nm | 25 nm | 66 nm |
| 4 | 57 nm | 20 nm | 57 nm |

Figure 9:
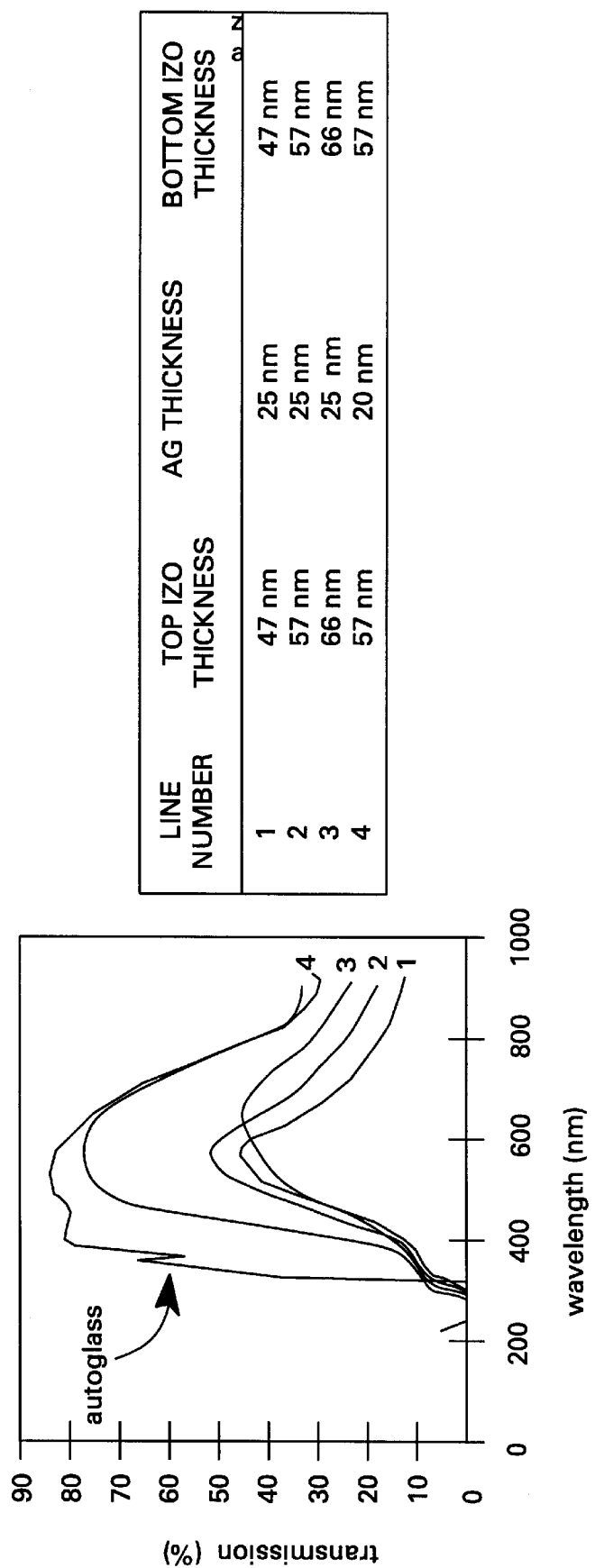
FIG. 9 is a graph of wavelength of incident light versus percent transmission of the incident light through a glazed substrate according to the specific examples of the invention.

A graph of transmission percent of the incident light versus the wavelength of the incident light for structures 1–4 compared to common light green autoglass is shown in FIG. 9. Structures 1–3 (labeled as lines 1–3 in FIG. 9) transmit about 40–50% and reflect 50–60% of the visible light (wavelength of 580 nm) as well as transmit 10–30% and reflect 70–90% of near IR radiation (wavelengths between 800 and 1500 nm). Structure 4 (labeled as line 4 in FIG. 9) transmits at least 70% and reflects less than 30% of the visible light at a wavelength of 580 nm, as well as transmits less than 40% and reflects at least 60% of near IR radiation.

The autoglass transmits about 83% of the visible light and reflects at least 60% of near IR radiation. Therefore, structure 4 has substantially the same near IR reflection as the autoglass and only about 13% less visible light transmission than the autoglass.

The near IR reflection of structures 1–3 is about the same as that of privacy glass (reflective glass used in limousines, etc.). However, the visible light transmission of structures 1–3 approaches 50%. This value is much higher then the typical 30% visible light transmission for privacy glass.

By using the multilayer structure according to exemplary embodiments of the present invention, excellent filtering of near IR radiation can be achieved while maintaining good transmission of visible light. The optical properties of the multi layer structure (i.e. the IZO/Ag/IZO glazing or film) can be tailored by selecting appropriate values of thickness for the Ag and IZO layers. The optical properties of the structure range from that of typical automotive glass with high visible light transmission of at least 70% and fairly high near IR reflection of about 40% (e.g. structure 4) to that of typical privacy automobile glass with visible light transmission of about 40–50% and superior near IR radiation reflection of 70–90% (structures 1–3).

To show the benefit of the IZO layers 2 and 4, comparison structures were fabricated (i.e. metal oxide/Ag/metal oxide structures) using $TiO_2$, and $CeO_2$ as the metal oxide layers having the same optical thickness (thickness times refractive index) as the IZO/Ag/IZO structures. The comparison structures reflected less than 10% of near IR radiation, compared to 60–90% for IZO containing structures 1–4. Therefore, even though IZO layers are generally thought of as UV absorption layers, they have an unexpected, synergistic beneficial result when used in the IZO/Ag/IZO structure of the present invention in preventing near IR radiation from reaching the substrate or window.

In the following examples, optical density ("OD", also known as "absorbance") refers to the absorbance of radiation having a wavelength of 350 nanometers (UV), defined as $\log(I_i/I_o)$, where $I_i$ is the intensity incident on the deposit and $I_o$ is the output intensity. Optical density was measured on a Unicam UV-3® spectrometer. Haze refers to the percentage of light scattering. The haze was measured using a Gardner XL-835® calorimeter. In Table 2 below, "high power" is 100 W (4.9 $W/cm^2$), and "low power" is 75 W (3.68 $W/cm^2$).

In Examples 5–6, the samples were subjected to a water soak test involving submerging the sample in 65° C. water for 24 hours.

Examples 7–13 were subjected to a QUV® accelerated weathering test (hereinafter the "QUV test"). This test was carried out in a model QUV environmental chamber manufactured by the Q-Panel Company. Samples were placed in the chamber and exposed for consecutive cycles, each cycle consisting of 5 hours at 60° C. with exposure to UV light (295 nm–370 nm, with a maximum at 340 nm, using UVA-340 lamps) followed by 1 hour at 50° C. with moisture condensation.

EXAMPLE 5

A glass substrate was cleaned in isopropyl alcohol and air dried. The reactor chamber was pumped to $2.7 \times 10^{-4}$ Pa prior to introduction of the reactive gas. The substrate was sputter etched at 100 watts for 2 minutes in an argon plasma at 1.2 Pa. A ZnO layer was deposited by RF magnetron sputtering on the substrate at a power of 100 W (power density=4.9 $W/cm^2$) and a pressure of 0.8 Pa from a ZnO target. The thickness of the ZnO layer was about 500 nm. The ZnO layer was subjected to a water soak test by being submerged in 65° C. water for 24 hours. The optical density at a wavelength of 350 nm and the haze were measured before and after the water soak test. The optical density of the ZnO layer decreased from 4.0 to 3.2, and Δ%H was 7% after the water soak test.

EXAMPLE 6

The experiment of example 5 was repeated, except the Ar sputtering gas was replaced with an Ar and 7% $O_2$ sputtering gas. The OD decreased from 3.9 to 3.5 after the water soak test. Δ %H was 5%.

EXAMPLE 7

The experiment of example 5 was repeated, except that the Ar sputtering gas was replaced with an Ar and 10% $O_2$ sputtering gas. In lieu of the water soak test, the QUV test was conducted, as described above, for 300 hours. The OD decreased from 4.2 to 3.4 after the QUV test. Δ %H was 1.4%.

EXAMPLE 8

The experiment of example 7 was repeated, except that the QUV test was extended to 1,000 hours (total). The OD decreased from 4.2 to 3.4 after the QUV test. Δ %H was 10%. The QUV test was continued to 3000 hours (not shown in Table 1), at which point the optical density had decreased to 0.2.

EXAMPLE 9

The experiment of example 7 was repeated, except that the ZnO layer was replaced with an $In_{0.025}Zn_{0.975}O$ layer deposited by DC magnetron sputtering from a 1.5 weight % indium IZO target and the sputtering power was decreased to 75 W. The OD remained constant at 4.2 after 300 hours of the QUV test. Δ %H after the QUV test was 0%.

EXAMPLE 10

The experiment of example 9 was repeated, except that the power was increased to 100 W. The OD remained constant at 4.0 after 300 hours of the QUV test. Δ %H after the QUV test was 0%.

EXAMPLE 11

The experiment of example 9 was repeated, except that the length of the QUV test was increased to 1000 hours (total). The OD decreased from 4.2 to 4.0 after the QUV test. Δ %H was 0%.

EXAMPLE 12

The experiment of example 10 was repeated, except that the length of the QUV test was increased to 1000 hours (total). The OD decreased from 4.2 to 4.0 after the QUV test. Δ %H was 0%.

Control Example 13

The experiment of example 8 was repeated, except that the ZnO layer was covered with a $SiO_2$ abrasion resistant layer to prevent water from reacting with the ZnO layer. This was done to separate the effect of UV exposure from water stability. The OD decreased from 4.2 to 4.1 after the QUV test. Δ %H was 12%. The increase in haze was associated with the $SiO_2$ layer, and not with the ZnO layer. Therefore, the UV exposure alone did not substantially affect the OD and Δ %H of the metal oxide layers.

The results of the weathering tests are summarized in Table 2 below.

TABLE 2

| # | Coating | Plasma | Power | Hours | OD | Results After Weathering Test OD | Δ % H |
|---|---------|--------|-------|-------|-----|-----|-----|
| 5 | ZnO | Ar | High | 24 | 4.0 | 3.2 | 7 |
| 6 | ZnO | 7% O$_2$ | High | 24 | 3.9 | 3.5 | 5 |
| 7 | ZnO | 10% O$_2$ | High | 300 | 4.2 | 3.4 | 1.4 |
| 8 | ZnO | 10% O$_2$ | High | 1000 | 4.2 | 3.4 | 10 |
| 9 | IZO | Ar | Low | 300 | 4.2 | 4.2 | 0.0 |
| 10 | IZO | Ar | High | 300 | 4.0 | 4.0 | 0.0 |
| 11 | IZO | Ar | Low | 1000 | 4.2 | 4.0 | 0.0 |
| 12 | IZO | Ar | High | 1000 | 4.0 | 4.0 | 0.0 |
| 13 | ZnO/SiO$_2$ | 10% O$_2$ | High | 1000 | 4.2 | 4.1 | 12 |

Examples 5 and 6, which were ZnO deposited with Ar and 7% O$_2$/Ar plasma, turned hazy after only 1 day of the water soak test. In comparison, examples 7–8 deposited with 10% oxygen exhibited good stability with little change after 300 hours of the QUV test. However, there was a considerable increase in haze after 1000 hours. The OD also deteriorated from 4.2 to 3.4. Therefore, ZnO layers with acceptable weather resistance may be deposited by reactive sputtering when sufficient oxygen reactant is present in the plasma.

All of the IZO samples 9–12 showed no significant degradation after 300 or 1000 hours of the QUV test, either in OD or haze. Samples 9 and 11 were deposited at a lower power (75 W) which results in a higher stress in the deposit. Based on this data there does not appear to be an effect of stress on stability. A preferred metal oxide UV absorbing layer 2, 4 of the coated structure described above has an optical density of at least 4.0 and exhibits substantially zero increase in haze after being exposed the QUV test for 300 or 1000 hours.

According another aspect of the invention, ZnO with an improved stability is formed by arc plasma deposition in which solid zinc is evaporated into the plasma (APD/evap.). According to this method, and as show in examples 14–17 below in Table 3, the plasma contains a stoichiometric excess of oxygen (i.e. greater than 50% oxygen). By contrast, when an organometallic zinc source is used with arc plasma deposition (APD) (examples 18–19) or when sputtering is used (examples 20–22), the plasma generally contains a stoichiometric deficiency of oxygen. The oxygen and zinc content in examples 14–22 was measured by X-ray photoelectron spectroscopy (XPS).

TABLE 3

| Sample | Zinc Source | Deposit Method | % Oxygen | % Zinc |
|--------|-------------|----------------|----------|--------|
| 14 | Zn | APD/evap. | 54.3 | 45.7 |
| 15 | Zn | APD/evap. | 54.0 | 46.0 |
| 16 | Zn | APD/evap. | 53.9 | 46.1 |
| 17 | Zn | APD/evap. | 53.5 | 46.5 |
| 18 | DEZ | APD | 42.8 | 52.6 |
| 19 | DMZ | APD | 31.9 | 61.5 |
| 20 | ZnO | Sputter | 45.3 | 49.8 |
| 21 | ZnO | Sputter | 46.9 | 48.1 |
| 22 | ZnO | Sputter | 38.0 | 61.6 |

The following examples 23–26 illustrate differences in water soak stability of ZnO layers deposited by various methods. In example 23, the ZnO layer was deposited by arc plasma deposition in which the zinc was evaporated into the plasma (see FIG. 6A). In examples 24 and 25, the ZnO layer was deposited by arc plasma deposition in which the zinc source was diethyl zinc (DEZ) (see FIG. 5A). In example 26, the ZnO layer was deposited by sputtering with a ZnO source (see FIG. 7). Δ OD per day for 21 days refers to the average decrease per day in optical density over 21 days of water soak in 65° C. water. Δ % haze after 7 days refers to the increase in haze after 7 days of water soak in 65° C. water.

TABLE 4

| Example | Method | zinc source | Δ OD per day for 21 days | Δ % haze after 7 days |
|---------|--------|-------------|--------------------------|-----------------------|
| 23 | APD/evap. | Zn | 0.016 | 1.7 |
| 24 | APD | DEZ | 0.077 | 18 |
| 25 | APD | DEZ | 0.155 | 18 |
| 26 | Sputtering | ZnO | 0.45 | 17.0 (3 days) |

As shown in Table 4, the ZnO layer formed by arc plasma deposition with evaporated zinc exhibited a significantly lower decrease in optical density per day as compared with the ZnO layers formed by sputtering and by arc plasma deposition with DEZ. Also, the ZnO layer formed by arc plasma deposition with evaporated zinc had a much lower increase in haze as compared with the ZnO layers formed by sputtering and by arc plasma deposition with DEZ. The examples in Tables 3 and 4 suggest that deposition with a plasma having a stoichiometric excess of oxygen may produce ZnO layers with improved water soak stability.

While the invention has been described in detail and with reference to specific embodiments thereof, it will be apparent to one skilled in the art that various changes and modifications can be made therein without departing from the spirit and scope of the invention.

What is claimed is:

1. A multilayer structure comprising:
a plastic substrate;
a first metal oxide layer on the plastic substrate;
an infrared radiation reflection layer on the first metal oxide layer; and
a second metal oxide layer on the infrared radiation reflection layer,
wherein each of the first and the second metal oxide layers comprise one of doped and undoped ZnO deposited by arc plasma deposition in which zinc is evaporated into a thermal plasma and wherein the doped and undoped ZnO have a stoichiometric excess of oxygen.

2. The structure of claim 1, wherein the plastic substrate comprises polycarbonate, polyestercarbonate, polyethersulfone or polyetherimide.

3. The structure of claim 1, wherein the first and the second metal oxide layers comprise ZnO, wherein ZnO is deposited by arc plasma deposition in which zinc is evaporated into a plasma.

4. The structure of claim 3, wherein the plasma contains a stoichiometric excess of oxygen.

5. The structure of claim 1, wherein the first and the second metal oxide layers comprise IZO.

6. The structure of claim 1, wherein the infrared radiation reflection layer comprises a metal.

7. The structure of claim 6, wherein the metal comprises silver or aluminum.

8. The structure of claim 1, wherein:
the plastic substrate comprises polycarbonate;
the infrared radiation reflection layer comprises silver; and the first and the second metal oxide layers comprise IZO.

9. The structure of claim 1, further comprising an aluminum or silver layer between the plastic substrate and the first metal oxide layer.

10. The structure of claim 1, further comprising an abrasion resistant layer over the second metal oxide layer.

11. The structure of claim 10, wherein the abrasion resistant layer comprises at least one of silicon dioxide, aluminum oxide, and plasma polymerized organosilicon.

12. The structure of claim 10, further comprising a plasma polymerized organosilicon interlayer between at least one of
a) the substrate and the first metal oxide layer; and
b) the second metal oxide layer and the abrasion resistant layer.

13. The structure of claim 1, further comprising a silicone hardcoat between the substrate and the first metal oxide layer, the silicone hardcoat comprising the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical.

14. The structure of claim 1, wherein:
the transmission of visible light through the structure is greater than 40 percent; and
the reflection of near IR radiation at wavelengths between 800 and 1500 nm from the structure is greater than 70 percent.

15. The structure of claim 1, wherein:
the transmission of visible light through the structure is at least 70 percent; and
the reflection of near IR radiation at wavelengths between 800 and 1500 nm from the structure is greater than 60 percent.

16. The structure of claim 1, wherein the thickness of the first and second metal oxide layers is between 40 and 70 nm and the thickness of the infrared radiation reflection layer is between 15 and 30 nm.

17. The structure of claim 16, wherein the thickness of the first and second metal oxide layers is about 57 nm and the thickness of the infrared radiation reflection layer is about 20 nm.

18. The structure of claim 1, wherein the first and second metal oxide layers have an optical density of at least 4 and exhibit substantially zero increase in haze after being subjected to a QUV test for at least 300 hours.

19. The structure of claim 1, wherein at least one of the first and second metal oxide layers consists essentially of $In_{0.02-0.15}Zn_{0.98-0.85}O$.

20. A window usable in a vehicle, a building, a display device or an apparatus, comprising:
a polycarbonate, polyestercarbonate, polyethersulfone or polyetherimide base;
a first ultraviolet radiation absorption layer comprising ZnO;
an infrared radiation reflection layer comprising silver or aluminum;
a second ultraviolet radiation absorption layer comprising ZnO, and wherein both ZnO layers have a stoichiometric excess of oxygen and are deposited by arc plasma deposition in which zinc is evaporated into a thermal plasma.

21. The window of claim 20, further comprising:
an abrasion resistant coating comprising alumina, silicon dioxide, acrylic or polymerized organosilicon over the second ultraviolet radiation absorption layer.

22. The window of claim 21, further comprising:
a first interlayer comprising polymerized organosilicon adjacent to the first ultraviolet radiation absorption layer; and
a second interlayer comprising aluminum or polymerized organosilicon adjacent to the abrasion resistant coating.

23. The window of claim 21, wherein:
the base comprises polycarbonate;
the first and second ultraviolet radiation absorption layers comprise IZO; and
the infrared radiation reflection layer comprises silver.

24. A multilayer article comprising:
a substrate;
a first doped ZnO layer
a metal IR reflecting layer; and
a second doped ZnO layer,
wherein both the first doped ZnO layer and the second doped ZnO layer have a stoichiometric excess of oxygen and are deposited by arc plasma deposition in which zinc is evaporated into a thermal plasma.

25. The multilayer article of claim 24, wherein the first and second doped ZnO layers comprise IZO.

26. The multilayer article of claim 24, wherein the first and second doped ZnO layers comprise AZO.

27. The multilayer article of claim 25, wherein the metal IR reflecting layer comprises at least one of silver and aluminum.

28. The multilayer article of claim 27, wherein the substrate comprises a polycarbonate.

29. A multilayer article comprising:
a substrate comprising a polymer resin;
a metal oxide layer;
an IR reflecting layer; and
a ZnO layer, wherein the ZnO layer has a stoichiometric excess of oxygen and is deposited by arc plasma deposition in which zinc is evaporated into a thermal plasma, and wherein after the multilayer article is submerged in 65° C. water for 7 days, an increase in haze is less than 1.7%, and wherein after the multilayer article is submerged in 65° C. water for 21 days, an average daily decrease in optical density is less than or equal to 0.016.

30. The multilayer article of claim 29, wherein the ZnO layer is deposited by arc plasma deposition in which zinc is evaporated into a plasma.

31. The multilayer article of claim 30, wherein the plasma contains a stoichiometric excess of oxygen.

* * * * *